United States Patent
Ishikawa et al.

(10) Patent No.: US 7,980,708 B2
(45) Date of Patent: Jul. 19, 2011

(54) DOCUMENT PRESENTATION DEVICE INCLUDING A MOVABLE PART

(75) Inventors: Hirokazu Ishikawa, Saitama (JP);
Junichi Yokoyama, Saitama (JP);
Takashi Nagashima, Saitama (JP);
Akinori Hamana, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 1273 days.

(21) Appl. No.: 11/448,038

(22) Filed: Jun. 7, 2006

(65) Prior Publication Data

US 2006/0279804 A1 Dec. 14, 2006

(30) Foreign Application Priority Data

Jun. 8, 2005 (JP) ............... P2005-168619
Jul. 15, 2005 (JP) ............... P2005-207656
May 26, 2006 (JP) ............... P2006-146985

(51) Int. Cl.
*G03B 21/14* (2006.01)
*G03B 21/22* (2006.01)
*G06F 3/041* (2006.01)
*G06F 17/00* (2006.01)

(52) U.S. Cl. .......... 353/119; 353/71; 345/173; 715/273; 715/253; 715/277

(58) Field of Classification Search ............ 353/119, 353/71; 345/173; 382/178; 715/273, 253, 715/277
See application file for complete search history.

(56) References Cited

U.S. PATENT DOCUMENTS

2003/0210229 A1 * 11/2003 Nishimura et al. ........... 345/157
2005/0040298 A1 2/2005 Ohki et al.

FOREIGN PATENT DOCUMENTS

| JP | 08-084275 | 3/1996 |
|---|---|---|
| JP | 8-84275 A | 3/1996 |
| JP | 11-065767 | 3/1999 |
| JP | 2000-10189 A | 1/2000 |
| JP | 2000-341572 | 12/2000 |
| JP | 2003-153041 | 5/2003 |
| JP | 2003-157432 | 5/2003 |
| JP | 2003-315915 | 11/2003 |
| JP | 2004-023253 | 1/2004 |
| JP | 2004-23253 A | 1/2004 |
| JP | 2004-23359 A | 1/2004 |
| JP | 2004-198868 | 7/2004 |
| JP | 2005-99708 | 4/2005 |
| JP | 2005-184106 | 7/2005 |

OTHER PUBLICATIONS

JP Office Action of corresponding application 2006-146985, dated Dec. 13, 2010, with English translation.
JP Office Action of corresponding application 2005-168619, dated Dec. 1, 2010, with English translation.

* cited by examiner

*Primary Examiner* — Georgia Y Epps
*Assistant Examiner* — Magda Cruz
(74) *Attorney, Agent, or Firm* — Birch, Stewart, Kolasch & Birch, LLP

(57) ABSTRACT

A document presentation device comprising an imaging unit that takes images of documents and a display unit that displays the images of documents taken by the imaging unit.

21 Claims, 25 Drawing Sheets

DOCUMENT PRESENTATION DEVICE INCLUDING A MOVABLE PART

BACKGROUND OF THE INVENTION

1. Field of the Invention

The present invention relates to a document presentation device for presenting documents at for example meetings or similar. More particularly the present invention relates to a document presentation device in which images of materials such as original documents are taken by an imaging unit and the image is displayed on a screen, display, or similar, and in particular to a document presentation device with an improved method of housing each part.

2. Related Background Art

In recent years document presentation devices have been used instead of overhead projectors (OHP) for projecting images of documents onto a screen, so that the audience at a presentation can refer to the projected image while the contents of the document is being explained.

For example, the document presentation device 99 shown in FIG. 1 includes a document base 90 forming the base of the device. The document base 90 includes a document loading surface 91 on which documents M are loaded. A display 93 is attached to the rear edge of the document base 90 via a hinge mechanism 92 so that the display 93 can freely open and close relative to the document base 90. In this way the angle of elevation of the display 93 can be adjusted manually as appropriate. In the open state the screen of the display 93 faces forward, and is visually checked by the presenter. Also, an arm 94 is included in the left hand corner of the rear of the document base 90. The arm 94 includes a support 94a set in the upright direction, and an approximately L-shaped horizontal member 94b on the top end of the support 94a whose end is positioned above the approximate center of the document base 91. On the end of the horizontal member 94b which is positioned virtually centrally over the document loading surface 91 an imaging unit 95 such as a lens or CCD camera is mounted (for example, refer to Japanese Patent Application Laid-open No. 2004-23253).

In a document presentation device 99 as described above, an image of a document M loaded on the document loading surface 91 is taken by the imaging unit 95, and the image is displayed on a screen (omitted in the figure) or on the display 93. The presenter (not shown on the drawings) can make a presentation while visually checking the image of the document M displayed on the display 93, by displaying a pointer image on the image of the document M in order to point out a desired location in the document image, and displaying alongside with the image of the document (M), supporting information that comments on the document M or an image.

Also, there are many features on projection devices and document presentation devices that allow a presentation to be effectively carried out. For example, in the presentation system using the document presentation device disclosed in Japanese Patent Application Laid-open No. 2004-23359, the movement of a pointing mark (for example, a pen provided with a lit LED) operated by the presenter is converted into movement of a pointing image displayed on the screen of the display device. In this way by operating the pointing mark the pointing image is moved to the desired location on the displayed image.

Many types of technique have been proposed to reduce the storage space of document presentation devices. For example, as disclosed in Japanese Patent Application Laid-open No. H8-84275, in the document presentation device 99, the horizontal member 94b is folded with respect to the support 94a, the support 94a is tilted onto the document loading surface 91, and the display 93 is tilted onto the document loading surface 91. In the storage condition of the document presentation device 99, the storage space can be made small, and the document presentation device 91 can be carried by holding a grip provided on a vertical surface of the document loading surface 91.

However, in the storage condition of the document presentation device 99, the display 93 and the arm 94 project from the document loading surface 91, and these projections look bad. Also, when the document presentation device 99 is being carried, if the projections are positioned towards the side of the body of the person carrying the document presentation device 99, the projections impinge on the body of the person, making the document presentation device 99 difficult to carry. On the other hand, if the projections are positioned on the opposite side of the document presentation device 99 to the body of the person, there is a danger that the projections will impact the corner of a desk or similar, causing damage to the document presentation device 99. Furthermore, the document loading surface 91 is permanently fixed to the top surface of the document base 90, so there is a limit to size reduction of the document presentation device 99.

SUMMARY OF THE INVENTION

Therefore, it is an object of the present invention to provide a document presentation device in which each part can be compactly housed with respect to the main body without the occurrence of projections, and in which the device can be made smaller, requiring small storage space and small installation space.

In a first aspect of an embodiment according to the present invention, a document presentation device includes: an imaging unit that takes images of documents; and a display unit that displays the images of documents taken by the imaging unit.

In another aspect of an embodiment according to the present invention, the document presentation includes: a support unit provided on the front surface of the main body; a first arm connected at the lower end thereof to a first end of the support unit; a second arm connected at the lower end thereof to a second end of the support unit rotatably so that the second arm can be tilted freely onto the front surface of the main body, an imaging unit that takes images of documents provided on the top surface of the first arm rotatably in the horizontal direction, a display unit that displays document images taken by the imaging unit provided on the upper end of the second arm rotatably, wherein the display unit can be housed in a concave portion formed on the front surface of the main body by the support unit, the first arm, and the second arm by rotating the second arm with respect to the front surface so that both are parallel and by rotating the imaging unit on the top surface of the first arm in the horizontal direction.

In the document presentation device according to the present invention, the display unit is housed on the front surface of the main body in the depression formed by the support unit, the first arm, and the second arm. Also the imaging unit is arranged on the top surface of the main body. Therefore, the support unit, the first arm, the second arm, the imaging unit, and the display unit do not project from the front surface of the main body, so the document presentation device with each part in the housed position looks good. Also, each part of the document presentation device can be housed compactly, so the storage space of the document presentation device can be reduced. Furthermore, when the document presentation device is being carried, if the front surface of the document presentation device is towards the side of the body of the person carrying it, projections do not impinge on the body of the person carrying the document presentation device as for a conventional document presentation device, so the document presentation device is easy to carry. On the other hand, when carried, if the front surface of the document presentation device is positioned on the side opposite the body of the person carrying the document presentation device, projections do not impinge on the corner of desks or similar, so damage to the document presentation device can be prevented In another aspect of an embodiment according to the present invention, the main body can be configured in many ways. For example, a concave portion can be provided on the top surface of the main body. Specifically, a grip can be provided on the top surface of the main body, and the imaging unit can be housed in the concave portion formed by the top surface of the main body and the grip. Also, a concave portion can be formed in the corner of the top surface of the main body to house the imaging unit. In this form, besides having no projections from the front surface of the main body as described above, the imaging unit does not project from the top surface of the main body. Therefore, the document presentation device becomes approximately rectangular when each part is in the housed condition, so the appearance is good, and damage to the document presentation device can be prevented.

In another aspect of an embodiment of the present invention, many types of configuration can be used to adjust the height of the imaging unit. For example, by allowing the lower end of the first arm that is connected to the first end of the support unit to freely rotate, the first arm can be made to tilt with respect to the front surface of the main body. In this case, the imaging unit on the top surface of the first arm can be made to rotate freely in the same direction as the lower end of the first arm. Also, the imaging unit can be made to slide along the first arm in the vertical direction. Furthermore, the first arm can be formed so that the first arm is flexible.

In another aspect of an embodiment of the present invention, the document whose image is taken by the imaging unit may be placed to the front of the main body of the document presentation device on the place where the document presentation device is installed. Also, a document loading platform on which documents are loaded and which is capable of being housed in the bottom surface of the main body may be provided. With this form, the document loading platform on which documents are loaded can be housed in the bottom surface of the main body when necessary. Therefore, the storage space of the document presentation device can be made smaller, the installation space can be made smaller, and the document presentation device can be made easier to carry.

In another aspect of an embodiment of the present invention, the document presentation device includes a document loading platform on which documents are loaded that is capable, of being housed in the bottom surface of the main body, and an imaging unit that takes images of documents loaded on the document loading platform.

In the document presentation device according to the present invention, the document loading platform on which documents are loaded can be housed in the bottom surface of the main body when necessary. Therefore, the storage space of the document presentation device can be made smaller, the installation space can be made smaller, and the document presentation device can be made easier to carry.

In another aspect of an embodiment according to the present invention, many types of configuration may be used for the document loading platform. For example, a document loading platform that can rotate on the bottom surface of the main body may be provided. Also, a document loading platform that can be folded under the bottom surface of the main body may be provided.

In another aspect of an embodiment according to the present invention, the document presentation device includes a display unit that displays images of documents taken by the imaging unit.

In another aspect of an embodiment of the present invention, the document presentation device comprising: an information input unit that inputs document information from a document output device; a display unit that displays image information taken by the imaging unit or document information input to the information input unit as either static images or moving images, the device integrally comprising: a switching unit that switches the information displayed in the display unit between the image information and the document information; a touch panel that receives input for instructions for the display unit; a superposition unit that superimposes instructions received from the touch panel as figures on the display unit; an information output unit that outputs the image information or document information displayed in the display unit to an image display device; and the information input unit.

In the document presentation device according to the present invention, images are taken of documents by the imaging unit, and the image information is displayed as either static images or moving images on the display unit. Therefore, users of the document presentation device can easily carry out presentations while image information is being displayed. Also, document information is input from a document output device to the information input unit, and the input document information is displayed as static images or moving images in the display unit. Therefore, users of the document presentation device can easily carry out presentations while document information is being displayed. Also, information displayed on the display unit can be switched between image information and document information by the switching unit. Therefore, users of the document presentation device can easily carry out presentations while switching the information displayed on the display unit.

Also, input instructions received by the touch panel for the display unit are superimposed on the display unit as graphic symbols such as arrow symbols, straight lines, or curved lines. Therefore users of the document presentation device can input instructions by touching the touch panel, and the instructions are displayed on the display unit as the above graphic symbols. As a result, it is possible to accurately indicate and display a desired location on the touch panel, and presentations can be easily carried out while using these graphic symbols. Also, image information or document information displayed on the display unit is output to an image display device by the information output unit. Therefore, users of the document presentation device can output image information or document information displayed on the display unit to an image display device, and presentations can be easily carried out while the information is displayed on the image display device. As described above, the document presentation device includes and integrates the imaging unit, the information input unit, the display unit, the switching unit, the touch panel, the superposition unit, and the information output unit. Therefore, the document presentation device can be easily carried, and presentations can be easily carried out while using the many functions.

In another aspect of an embodiment according to the present invention, the touch panel includes an operation unit that carries out operations on image information or document information displayed on the display unit. In this way operations such as display, replay, pause, slow replay, fast forward, and fast rewind can be carried out on the image information or document information displayed on the display unit as either static images or moving images.

In another aspect of an embodiment of the present invention, the document presentation device further includes an image processing unit that carries out image processing on the image information or document information. The display unit displays the image processed information that is image processed by the image processing unit. In this way information on which image processing has been carried out by the image processing unit, such as zooming in to or zooming out of the image, is displayed on the display unit. Therefore, users of the document presentation device can easily make presentations while using the image processed information.

In another aspect of an embodiment according to the present invention, the document presentation device further includes a memory unit that records image information or document information displayed on the display unit, and an editing unit that edits information recorded in the memory unit. In this way, image information or document information displayed on the display unit can be recorded and the recorded information can be edited.

In another aspect of an embodiment according to the present invention, the touch panel outputs instructions received by the touch panel to an instruction input device. In this way, instructions input by touching the touch panel are output to an instruction input device (for example, a personal computer or the like) connected to the document presentation device. Therefore, by inputting instructions to the touch panel, operations (for example, double click or similar) as an input device, such as a mouse or similar, or instructions, including drawing or similar, can be carried out on the instruction input device.

In another aspect of an embodiment according to the present invention, the document presentation device further includes a sound output unit that outputs sound of the image information or document information, and/or a sound input unit that receives sound input for the image information or document information. In this way, sound can be output for the image information or document information, and/or sound input can be received for the image information or document information.

In another aspect of an embodiment according to the present invention, the document presentation device further includes a code reading unit that reads identification codes allocated to the image information or document information displayed on the display unit to identify the image information or document information, so that the display unit displays the image information or document information corresponding to the identification codes read by the code reading unit. In this way, the display unit can display the image information or document information corresponding to the identification codes read by the code reading unit. Therefore, users of the document presentation device can easily make presentations while using the code reading unit to read identification codes, and displaying the image information or document information on the display unit.

In another aspect of an embodiment according to the present invention, the document presentation device further includes a code output unit that outputs to a printing device identification codes allocated to the image information or document information displayed on the display unit to identify the image information or document information. In this way, identification codes for identifying the image information or document information are output to a printing device. Therefore, users of the document presentation device can print identification codes to a printing device. In this way users of the document presentation device need only prepare the printed identification codes when carrying out a presentation. Also, users can easily carry out presentations by simply reading the identification codes with the code reading unit, and displaying the image information or document information on the display unit.

In another aspect of an embodiment according to the present invention, the document presentation device comprising: an information input unit to which document information from a document output device is input; a display unit that displays image information taken by the imaging unit or document information input by the information input unit as either static images or moving images; a touch panel that receives input for instructions for the display unit, the device integrally comprising; a superposition unit that superimposes instructions received from the touch panel as figures on the display unit; a projector unit that projects image information or document information displayed on the display unit on a projection area; the imaging unit; the information input unit; and the display unit.

In the document presentation device according to the present invention, images of documents are taken by the imaging unit, and the image information is displayed as either static images or moving images on the display unit. Therefore, users of the document presentation device can easily make presentations while displaying the image information. Also, document information is input from a document output device to the information input unit, and the input document information is displayed as either static images or moving images on the display unit. Therefore, users of the document presentation device can easily make presentations while displaying the document information.

In another aspect of an embodiment according to the present invention, the document presentation device further includes a switching unit that switches the information displayed on the display unit between image information and document information, and an information output unit that outputs image information or document information displayed on the display unit to an image display device.

In this way it is possible to switch the information displayed in the display unit between image information and document information. Therefore users of the document presentation device can easily make presentations while switching the information displayed on the display unit. Also, image information or document information displayed on the display unit is output to an image display device via the information output unit. Therefore users of the document presentation device can easily make presentations while outputting the image information or document information displayed on the display unit to an image display device, and displaying the information on the image display device.

In another aspect of an embodiment according to the present invention, the document presentation device further includes a casing having the display unit; a first rotatable body that projects from a side wall of the casing and that can freely rotate about the direction of projection; and a second rotatable body that is provided on the first rotatable body so that the second rotatable body supports the projector unit rotatably about a direction perpendicular to the projection direction of the first rotatable body.

In this way the second rotatable body supports the projector unit so that the projector unit can freely rotate about a direction perpendicular to the projection direction of the first rotatable body. Therefore the projection unit supported by the second rotatable body can freely rotate about a direction perpendicular to the projection direction of the first rotatable body. In other words, the projector unit can freely rotate in a plane perpendicular to the side wall of the Casing. Also, the first rotatable body is provided projecting from the side wall of the casing, and can freely rotate about the projection direction. Therefore, the projector unit supported by the second rotatable body provided on the first rotatable body can freely rotate about the projection direction of the first rotatable body. In other words, the projector unit can freely rotate in a plane parallel to the side wall of the casing. As a result, the projector unit can be arbitrarily moved in a free direction, so it is easy to project onto the projection area regardless of the position of the projection area.

In another aspect of an embodiment according to the present invention, the document presentation device further includes a casing having the display unit; a first rotatable body that projects from a side wall of the casing and that can freely rotate about the direction of projection; an opening and closing unit that can open and close provided at one end of the first rotatable body having a reflection surface on a face opposite to the projector unit when the opening and closing unit is closed, and changes the direction of reflection of the image information or document information projected by the projector unit outside the document presentation device by the opening and closing operation.

In this way, the direction that the image information or document information projected by the projection unit is reflected outside the document presentation device is changed by the opening and closing operation of the opening and closing unit. As a result, the direction that the image information or document information projected by the projection unit is reflected outside the document presentation device can be arbitrarily changed to a free direction. Also, the first rotatable body is provided projecting from the side wall of the casing and can freely rotate about the projection direction. Therefore, the opening and closing unit provided on the first rotatable body can rotate freely about the projection direction of the first rotatable body. In other words, the direction of reflection of image information or document information outside the document presentation device can be freely rotated in a plane parallel to the side wall of the casing. As a result, the direction of reflection of image information or document information outside the document presentation device can be arbitrarily changed in a free direction. Therefore, it is easy to project onto the projection area regardless of the position of the projection area.

In another aspect of an embodiment according to the present invention, the first rotatable body can be separated from the side wall of the casing, and the first rotatable body is connected to the side wall of the casing so that the image information taken by the imaging unit or the document information input by the information input unit can be projected on the projection area by the projector unit.

In this way, the projection unit can project image information taken by the imaging unit or document information input by the information input unit onto the projection area while the first rotatable body is separated from the side wall of the main body. As a result, the projection unit supported by the second rotatable body provided on the first rotatable body can be arbitrarily moved to a more free position. Therefore, it is easy to project onto the projection area regardless of the position of the projection area. Also, connecting wires or cables are not required apart from the cable connecting the first rotatable body and the side wall of the main body. Therefore, it is possible to reduce the preparation work required to carry out a presentation.

BRIEF DESCRIPTION OF THE DRAWINGS

FIG. 3 is an isometric view showing the document presentation device of

FIG. 2A or 2B with the grip and support unit shown on the body;

DESCRIPTION OF THE PREFERRED EMBODIMENTS

The first, second, third, and fourth embodiments of the present invention will be explained with reference to the drawings. In the explanations of the drawings, the same elements are given the same symbol, and duplication of explanations has been omitted.

(1) The First Embodiment (1-1) Configuration of the First Embodiment

Figure 1:
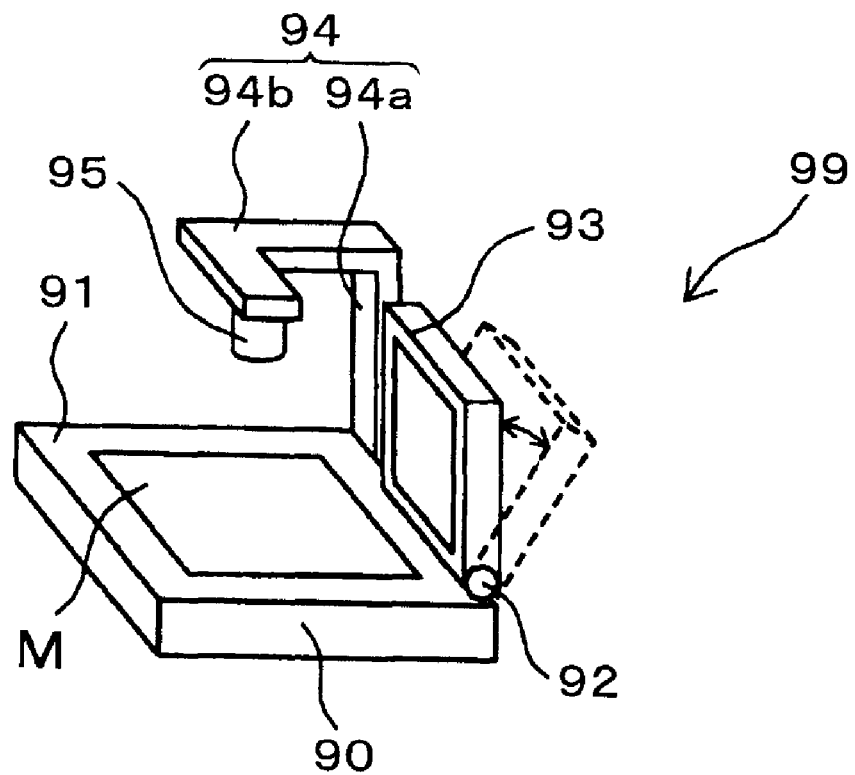
FIG. 1 is an isometric view showing the configuration of a conventional document presentation device.
Figure 2A:
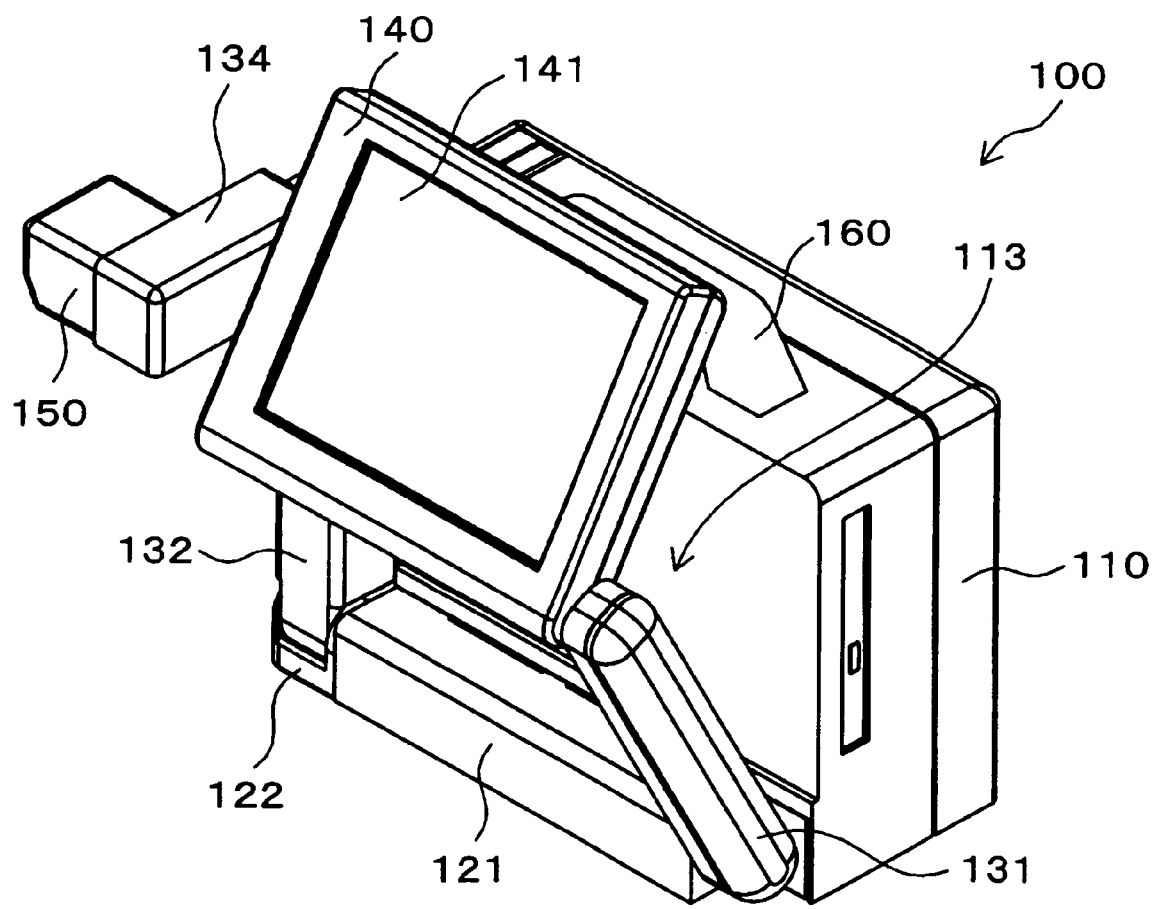
FIG. 2A is an isometric view of a document presentation device according to a first embodiment of the present invention.
Figure 2B:
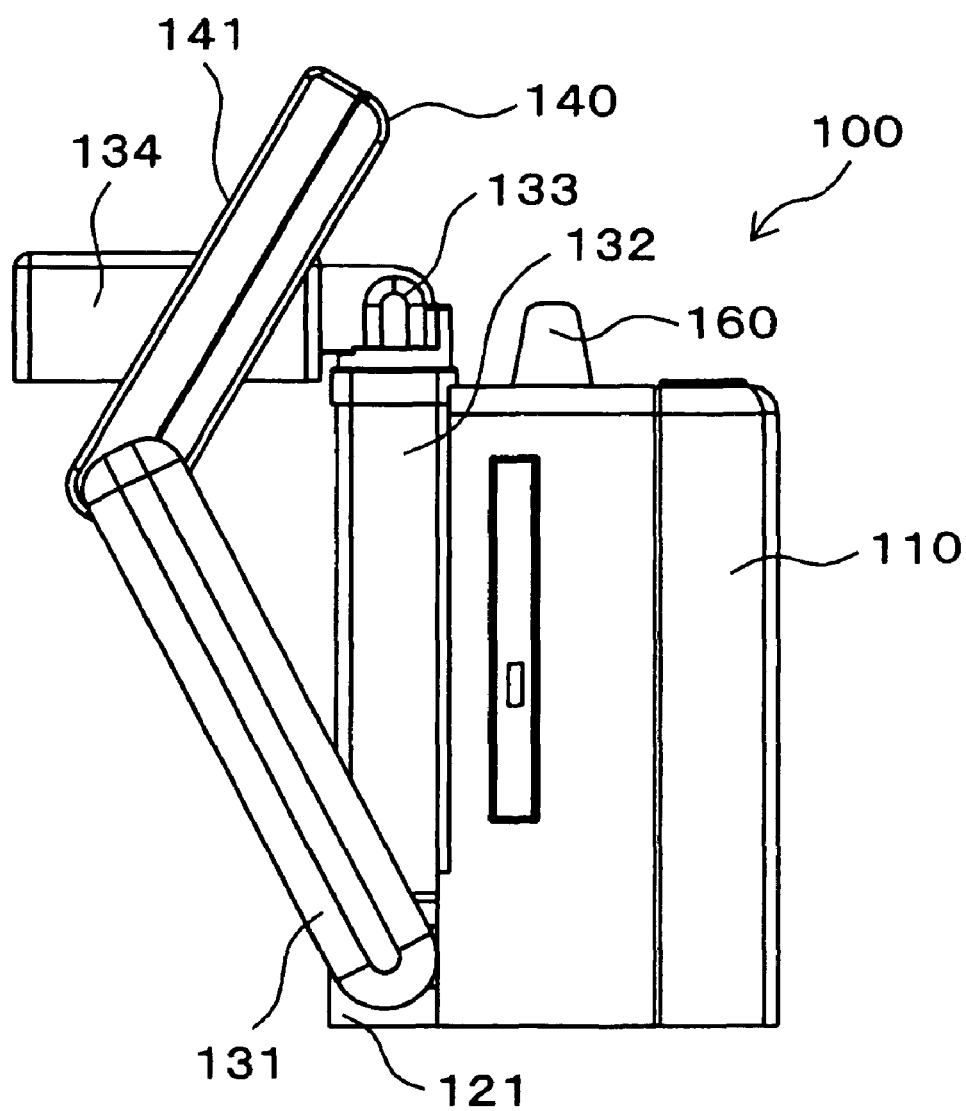
FIG. 2B is an side view of a document presentation device according to the first embodiment of the present invention.
Figure 3:
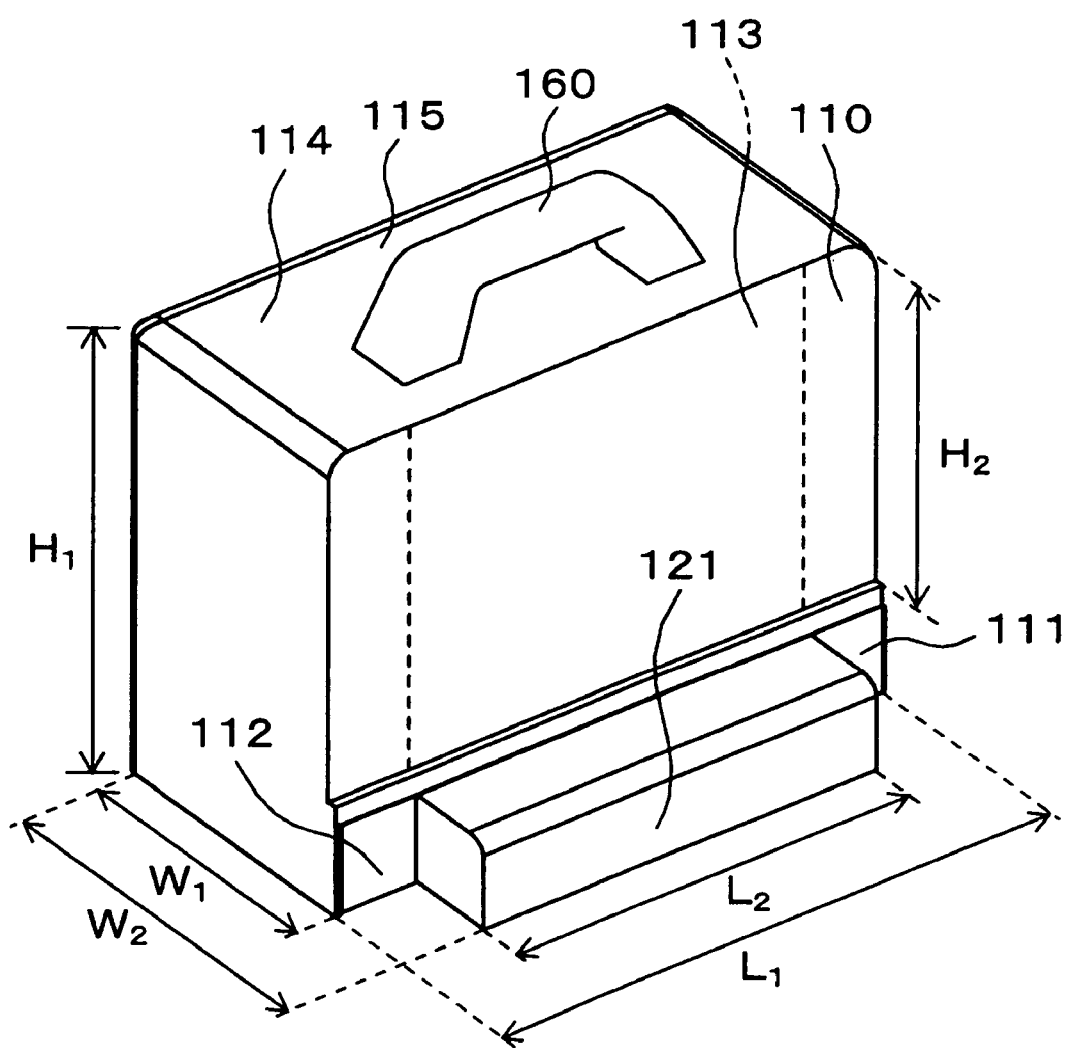
Figure 4:
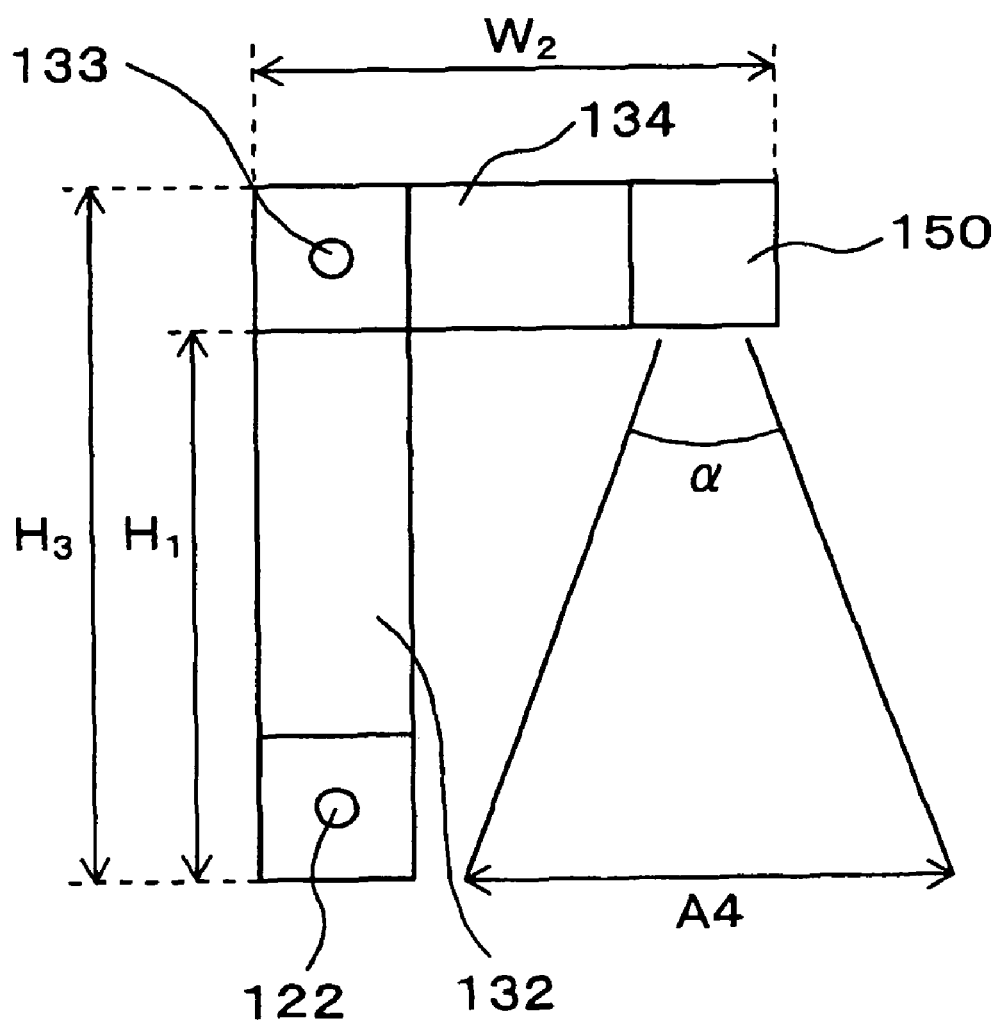
FIG. 4 is a schematic side view showing the setting of the field of view by the imaging unit and a document within the field of view in the document presentation device of FIG. 2A or 2B.

The following is an explanation of a first embodiment of the present invention with reference to the drawings. FIGS. 2A and 2B show the configuration of a document presentation device 100 according to a first embodiment of the present invention. FIG. 2A is an isometric view and FIG. 2B is a side view. FIG. 3 is an isometric view of the document presentation device 100 of FIG. 2A and 2B showing only a grip 160 on a main body 110 and a hinge mechanism 121 FIG. 4 is a schematic side view of the document presentation device 100 of FIG. 2A and FIG. 2B showing a field of view α set by an imaging unit 150 and an A4 sized document within the field of view α. The document presentation device 100 includes a main body 110. As shown in FIG. 3, the main body 110 has length L1, width W1, and height H1. To reduce the storage and installation space of the document presentation device 100, the length L1, the width W1, and the height H1 satisfy for example the relationship W1<H1, W1<L1. The hinge mechanism 121 is prism shaped, fixed so that it extends along the horizontal direction of the main body 110 at the middle of the lower part of the front surface of the main body 110. As shown in FIG. 3, the hinge mechanism 121 has a length L2, and the height from the top surface of the hinge mechanism 121 to the top surface of the main body 110 is H2. A concave portion 111 is formed in the lower right corner of the front surface of the main body 110 by the front surface of the main body 110 and the right hand side surface of the hinge mechanism 121. A concave portion 112 is formed in the lower left corner of the front surface of the main body 110 by the front surface of the main body 110 and the left hand side surface of the hinge mechanism 121.

The lower end of an arm 131 (second arm) is installed on the right hand side surface of the hinge mechanism 121 in the concave portion 111 so that the arm 131 can freely rotate. The angle of inclination of the arm 131 can be adjusted with respect to the front surface of the main body 110. The right hand surface of the arm 131 is in approximately the same plane as the right hand surface of the main body 110. A hinge mechanism 122 is fixed to the concave portion 112, and the lower end of an arm 132 (first arm) is provided in the center of the hinge mechanism 122 so that the arm 132 can freely rotate. In this way the angle of inclination of the arm 132 with respect to the front surface of the main body 110 can be adjusted. The left hand surface of the hinge mechanism 122 and the arm 132 are in approximately the same plane as the left hand side surface of the main body 10. When the arm 131 and the arm 132 are folded onto the front surface of the main body 110, the top surface of the arm 131 and the top surface of the arm 132 are in approximately the same plane as the top surface of the mainbody 110.

A hinge mechanism (not shown in the drawings) is provided within the top end of the arm 131. The lower end of a display 140 is provided on the left end of the hinge mechanism so that the display 140 can freely rotate. In this way the angle of elevation of the display 140 can be adjusted. On the other hand, the height position of the display 140 can be adjusted by tilting the arm 131. The display 140 is located between the arm 131 and the arm 132, and during use a display panel 141 is set to face in the front direction. The front surface of the display 140 has the same area as a concave portion 113 formed on the main body 110 between the hinge mechanism 121, the arm 131, the arm 132 (=L2×H2).

The display 140 can be for example a liquid crystal display including a pressure sensitive display panel 141. Images taken by an imaging unit 150 described below are displayed in the display panel 141. When a specific position is pressed in the display panel 141 of the display 140, a pointer image is displayed at the position pressed, and in this way it is possible to indicate a desired position on the displayed image.

On the top surface of the arm 132 a hinge mechanism 133 is provided that can freely rotate along the top surface of the arm 132. A rear end of an arm 134 is provided so that it can freely rotate in the center of the hinge mechanism 133. In this way the angle of inclination of the arm 134 can be adjusted with respect to the top surface of the main body 110. As shown in FIG. 4, the length of the arm 134 is W2 along the width direction of the main body 110. When in the attitude shown in FIG. 2A, FIG. 2B, and FIG. 4, the arm 134 has a height H3. The imaging unit 150 is provided along the front end of the left hand surface of the arm 134 so that the imaging unit 150 can freely rotate.

The imaging unit 150 includes a video CCD camera and a lens arranged at a predetermined distance below the CCD camera. In FIG. 2A and FIG. 2B the arm 132 is extended in the vertical direction, the arm 132 and the arm 134 are mutually at right angles, and the CCD camera of the imaging unit 150 is arranged to point vertically downwards. In this case, as shown in FIG. 4, the lower surface of the imaging unit 150 is positioned at a height H1 in the vertical direction from the lower surface of the main body 110. The upper surface of the imaging unit 150 is positioned at a height H3 in the vertical direction from the lower surface of the main body 110. The front surface of the imaging unit 150 is positioned at a distance W2 in the horizontal direction from the front surface of the main body 110. The f value of the lens is such that when the imaging unit 150 is in the attitude shown in FIG. 2A, FIG. 2B, or FIG. 4, a predetermined size of document (for example, A4 size) is encompassed. Also, alternatively the imaging unit 150 may include a zoom function, so that the zoom ratio of the lens can be adjusted.

A grip 160 is fixed in the center of the top surface of the main body 110. As shown in FIG. 3, a concave portion 114 is formed by the grip 160 and the left hand end of the top surface of the main body 110. A concave portion 115 is formed by the grip 160 and the rear part of the top surface of the main body 110 in approximately the center.

A control unit (not shown in the drawings) that processes images taken by the imaging unit 150 is provided inside the main body 110. Image processing by the control unit includes for example creating a pointer image at the location on the image corresponding to a position on the display panel 141 of the display 140 that was pressed. Images processed by the control unit are displayed on a screen by a liquid crystal projector (not shown on the drawings) as well as on the display 140.

(1-2) Operation of the First Embodiment

Figure 5A:
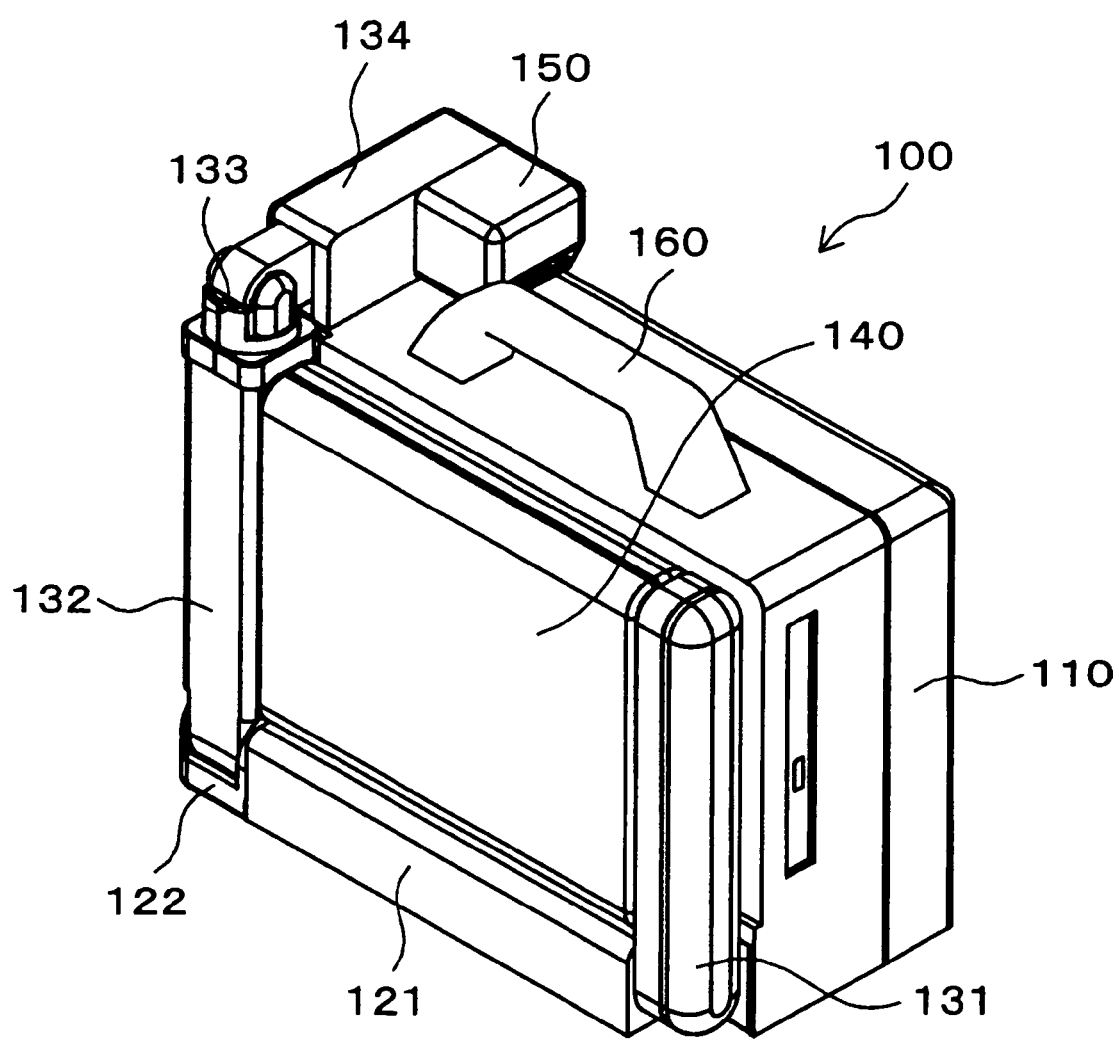
FIG. 5A is an isometric view showing the document presentation device of FIG. 2A or 2B with each part in the storage condition.
Figure 5B:
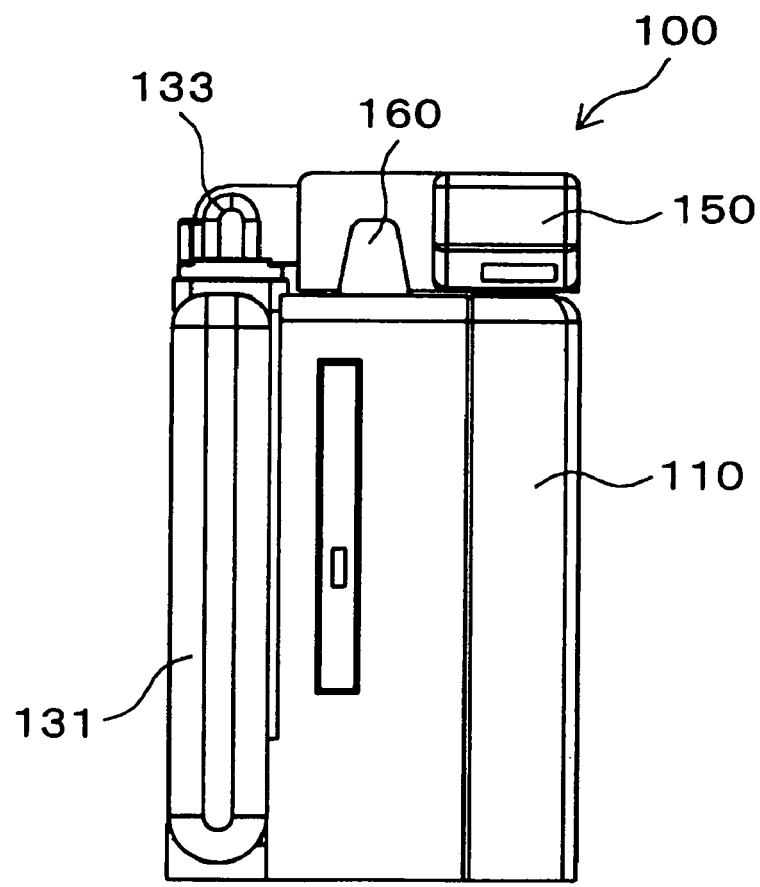
FIG. 5B is a side view showing the document presentation device of FIG. 2A or 2B with each part in the storage condition.

Next, an example is explained of the method of housing each part with respect to the main body 110 of the document presentation device 100, from the attitude shown in FIG. 2A and FIG. 2B to the attitude shown in FIG. 5A and FIG. 5B. FIG. 5A and FIG. 5B shows the document presentation device 100 of FIG. 2A and FIG. 2B with each part in the storage condition, FIG. 5A is an isometric view, FIG. 5B is a side view.

First, the display 140 with the display panel 141 facing to the front as shown in FIG. 2A and FIG. 2B is rotated to the front using the hinge mechanism at the top end of the arm 131 so that the display panel 141 of the display 140 is brought into confrontation with the front surface of the main body 110. Then, while rotating the display 140 about the top end of the arm 131 so that both are parallel, by folding the arm 131 onto the front surface of the main body 110, the display panel 141 side of the display 140 and the rear side surface of the arm 131 are tilted with respect to the front surface of the main body 110 by the hinge mechanism 121.

Next, the arm 134 and the imaging unit 150 shown in FIG. 2A and FIG. 2B are rotated in the horizontal direction to the left about the hinge mechanism 133, so that the imaging unit 150 is positioned to the rear left hand side of the grip 160, and the arm 134 is positioned on the left hand end of the top surface of the main body 110. If the arm 132, the arm 134, or the imaging unit 150 are not in the attitude shown in FIG. 2A and FIG. 2B, the following operation is carried out. In other words, the arm 132 is tilted about the hinge mechanism 122 with respect to the front surface of the main body 110, and the rear surface of the arm 132 is folded onto the base 110. Next, the arm 134 is rotated about the hinge mechanism 133 to form a reversed L-shape between the arm 132 and the arm 134. Next the imaging unit 150 is rotated with respect to the arm 134, so that the CCD camera of the imaging unit 150 is facing vertically downwards.

By arranging each part of the document presentation device 100 with respect to the main body 110 as described above, the display 140 is housed on the front surface of the main body 110 in the depression 113 formed by the hinge mechanism 121, the arm 131, and the arm 132. These parts 121, 131, 132, 140 form the same plane as the front surface of the main body 110. Also, the arm 134 is housed in the concave portion 114 formed in the left hand end of the grip 160 and the top surface of the main body 110. The imaging unit 150 is housed in the concave portion 115 formed by the grip 160 and the rear of the top surface of the main body 110 in approximately the center. Therefore these parts 134, 150, 160 form the same plane as the top surface of the main body 110.

In this embodiment, the display 140 is housed on the front surface of the main body 110 in the depression 113 formed by the hinge mechanism 121, the arm 132, and the arm 131. Also the imaging unit 150 is arranged on the top surface of the main body 110. Therefore, the hinge mechanism 121, the arm 132, the arm 131, the imaging unit 150, and the display 140 do not project from the front surface of the main body 110, so the document presentation device 100 with each part in the housed position looks good. Also, each part of the document presentation device 100 can be housed compactly, so the storage space of the document presentation device 100 can be reduced. Furthermore, when the document presentation device 100 is being carried, if the front surface of the document presentation device 100 is towards the side of the body of the person carrying it, projections do not impinge on the body of the person carrying the document presentation device 100 as for a conventional document presentation device, so the document presentation device 100 is easy to carry. On the other hand, if the front surface of the document presentation device 100 is positioned on the side opposite the body of the person carrying the document presentation device 100 when carried, projections do not impinge on the corner of desks or similar, so damage to the document presentation device 100 can be prevented.

In particular, the arm 134 and the imaging unit 150 are arranged in the concave portions 114, 115 formed on the top surface of the main body 110, so they do not project from the front surface of the main body 110 as described above, and in addition the arm 134 and the imaging unit 150 have no projections from the top surface of the main body 110. Therefore, the document presentation device 100 with all the parts in their housed position forms an approximately rectangular solid shape, and as a result the appearance is good, and damage to the document presentation device 100 can be prevented.

(1-3) Modified Embodiments

Figure 6:
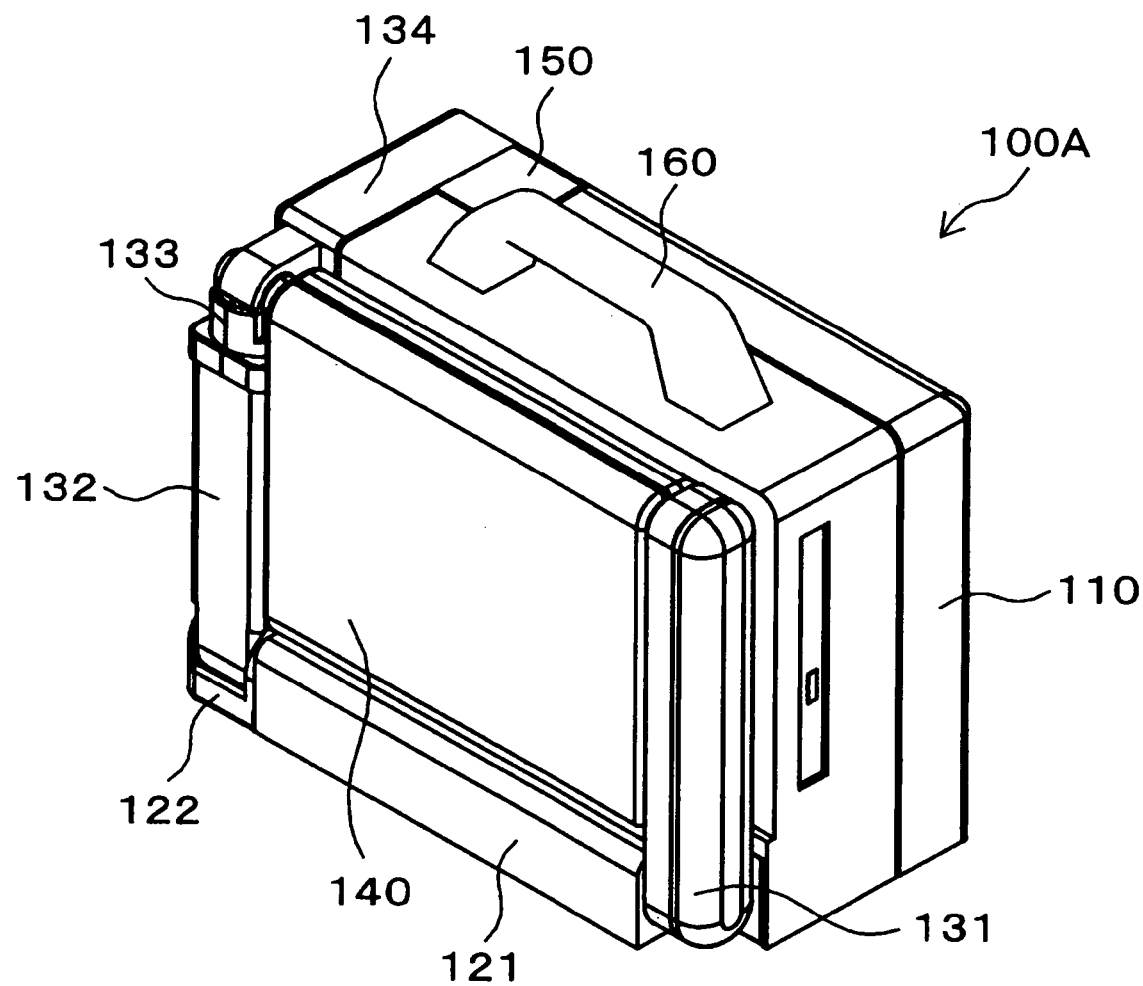
FIG. 6 is an isometric view of a modification to the document presentation device according to the first embodiment of the present invention with each part in the storage condition.
Figure 7:
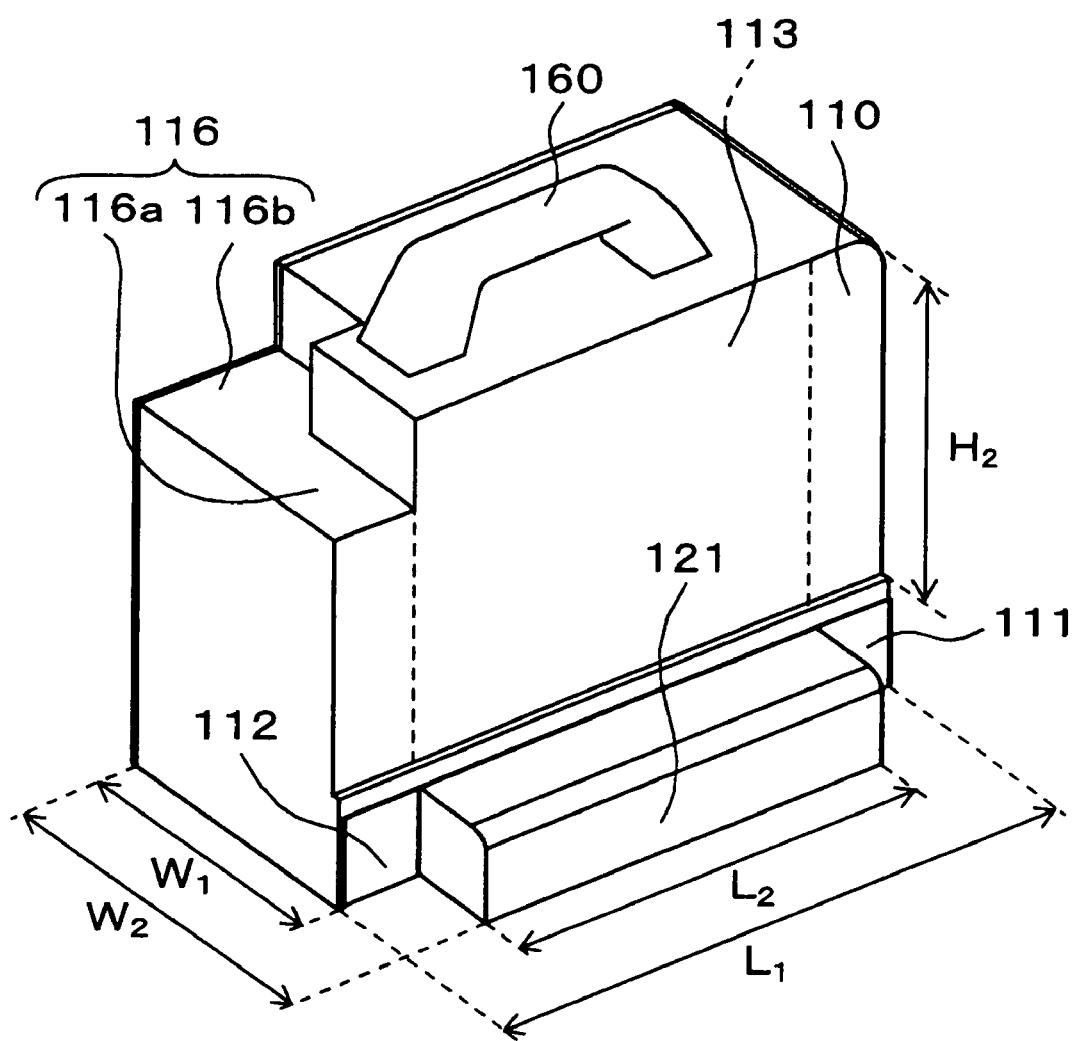
FIG. 7 is an isometric view of a modification of the document presentation device of FIG. 6 showing only the grip and the support unit.

The present invention was explained using the above first embodiment, but the present invention is not limited to the above first embodiment, and many types of modification are possible. For example, in the above first embodiment the arm 134 and the imaging unit 150 are housed in concave portions 114 and 115 formed by the top surface of the main body 110 and the grip 160. However, a concave portion 116 formed in the top surface of the main body 110 may be used, as shown in the document presentation device 100A in FIG. 6 and FIG. 7. The concave portion 116 includes a concave portion 116a and a concave portion 116b that is integral with the concave portion 116a. The concave portion 116a is formed in the vertical direction along the left side edge of the main body 110. The concave portion 116b is formed in the horizontal direction along the rear side edge of the main body 110 as far as approximately the center. The arm 134 is housed in the concave portion 116a in the vertical direction, and the imaging unit 150 is housed in the concave portion 116b in the horizontal direction.

Also, in the above first embodiment the arm 132 can tilt with respect to the main body 110 about the hinge mechanism 122. However, instead of providing the hinge mechanism 122, a slide mechanism may be provided on the arm 132, so that the arm 134 can slide along the vertical direction of the arm 132. Furthermore, instead of providing the hinge mechanisms 122, 133 on the arms 132, 134, the arms 132, 134 may be integrated and made flexible.

Figure 8:
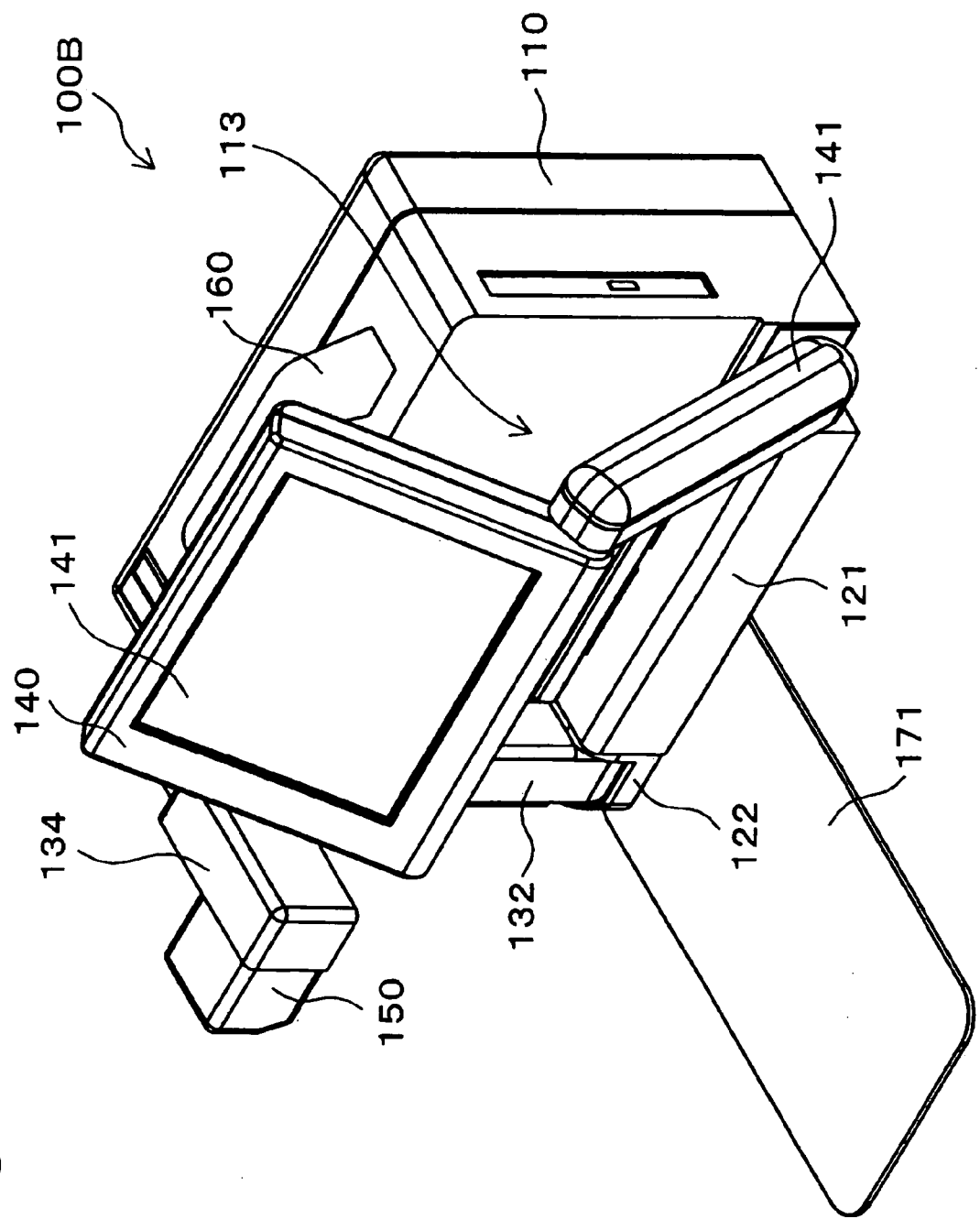
FIG. 8 is an isometric view showing the configuration of a modification of the document presentation device according to the first embodiment of the present invention.
Figure 9:
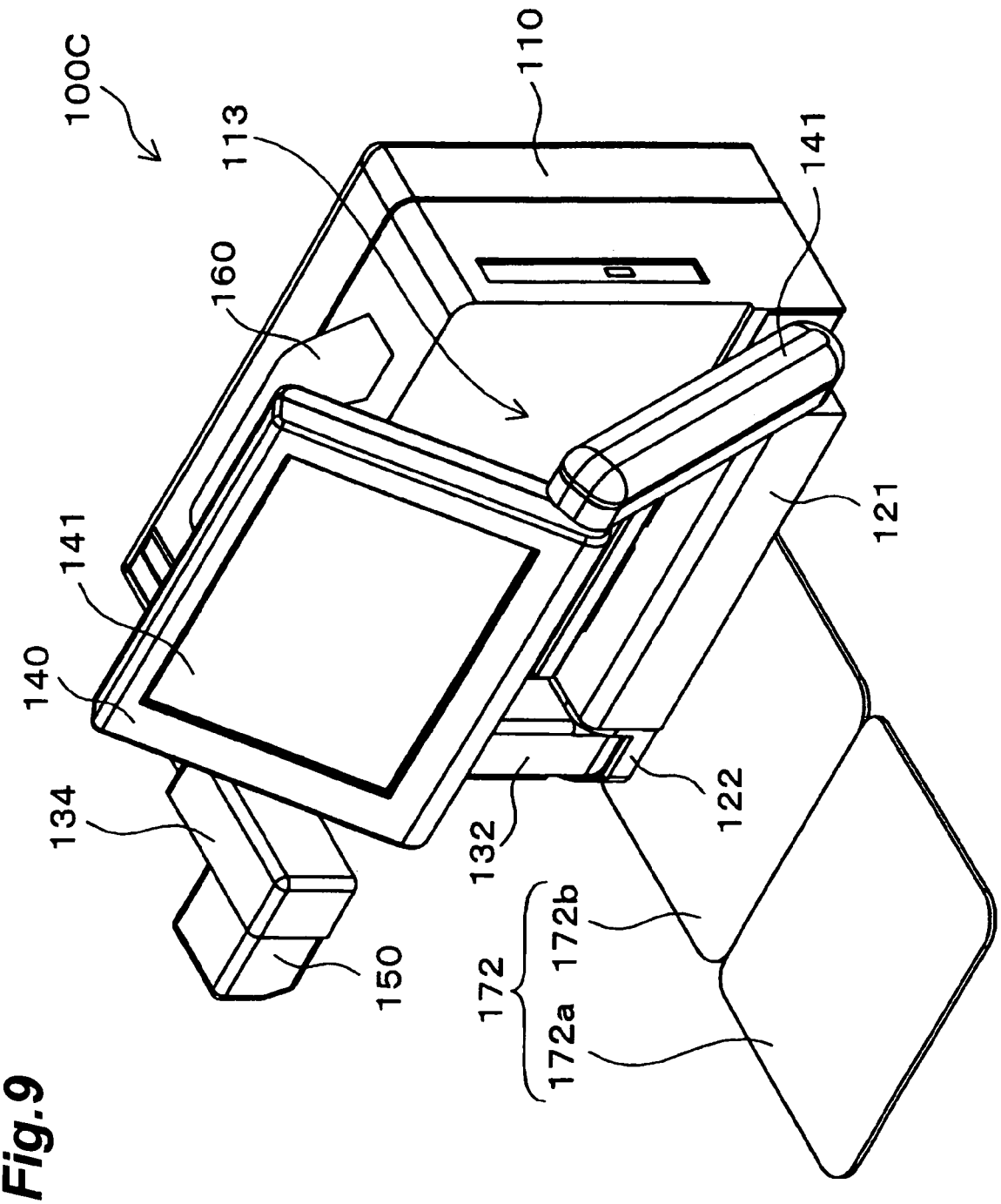
FIG. 9 is an isometric view showing the configuration of a modification of the document presentation device according to the first embodiment of the present invention.

In addition, in the above first embodiment a document is placed in front of the main body 110, but a document loading platform may be provided on the bottom surface of the main body 110 for loading documents. For example, in the document presentation device 100B as shown in FIG. 8, a document loading platform 171 may be provided below the bottom surface of the main body 110 that can rotate about the bottom surface of the hinge mechanism 122. The document loading platform 171 has the same plane shape as the bottom surface of the main body 110. In this case, it is desirable that the document loading platform 171 is provided with a center of rotation so that when the document loading platform 171 is set by rotating it, the center of the document loading platform 171 coincides with the center of the imaging unit 150 set in the position shown in FIG. 4 (in other words, the center of an A4 size document). Also, a foldable document loading platform 172 may be provided on the bottom surface of the main body 110, as shown in the document presentation device 100C in FIG. 9. The document loading platform 172 includes two plane document loading platforms 172a, 172b, and document loading platform 172b can be folded with respect to the document loading platform 172a.

In the above form, the document loading platform 171 or the document loading platform 172 can be housed in the bottom surface of the main body 110 when necessary. Therefore, the storage space and the installation space of the document presentation device 100 can be reduced, and the document presentation device 100 can be made easy to carry.

(2) The Second Embodiment

(2-1) Configuration of the Second Embodiment

Figure 10:
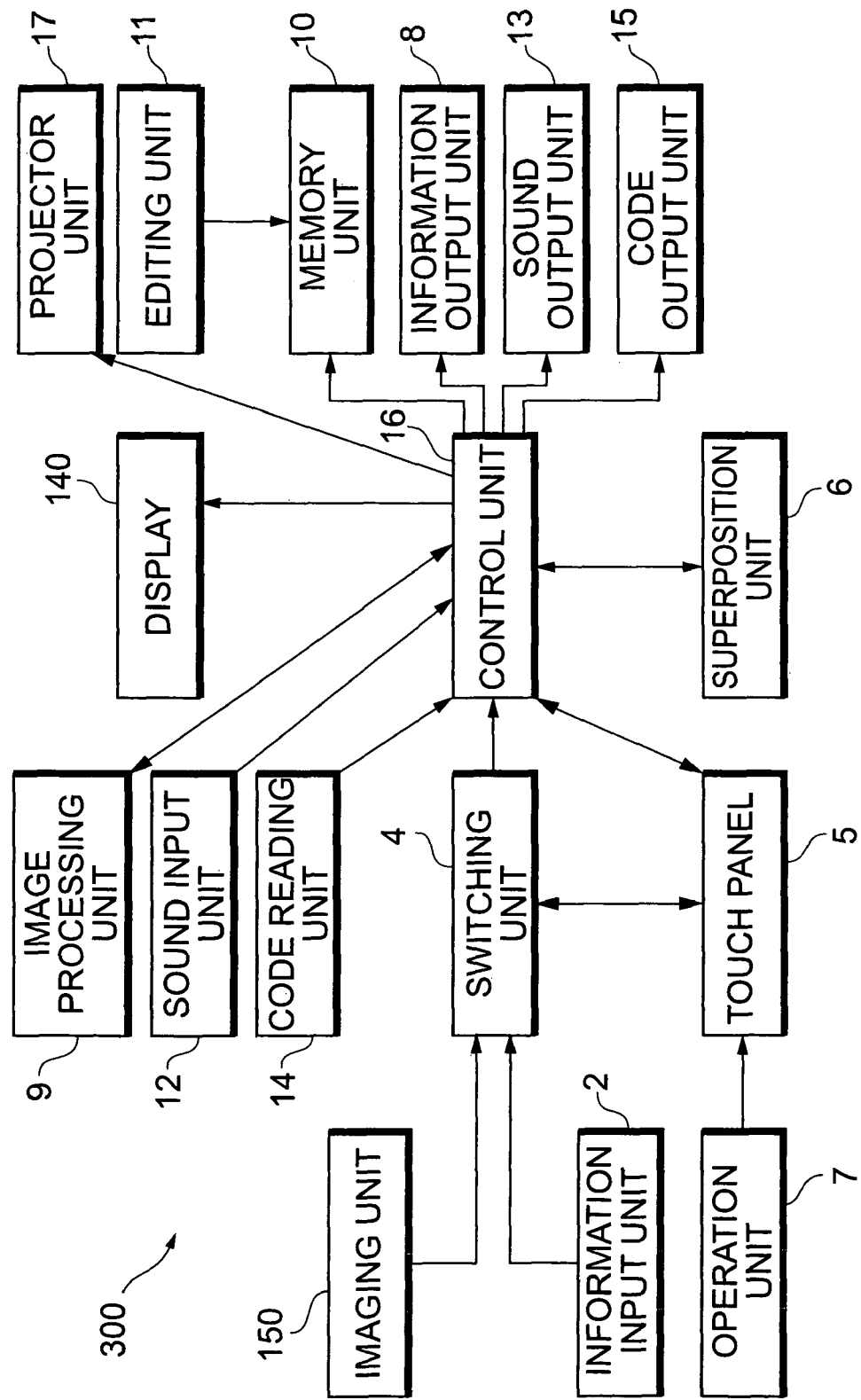
FIG. 10 is a block diagram of a document presentation device according to a second embodiment of the present invention.
Figure 11A:
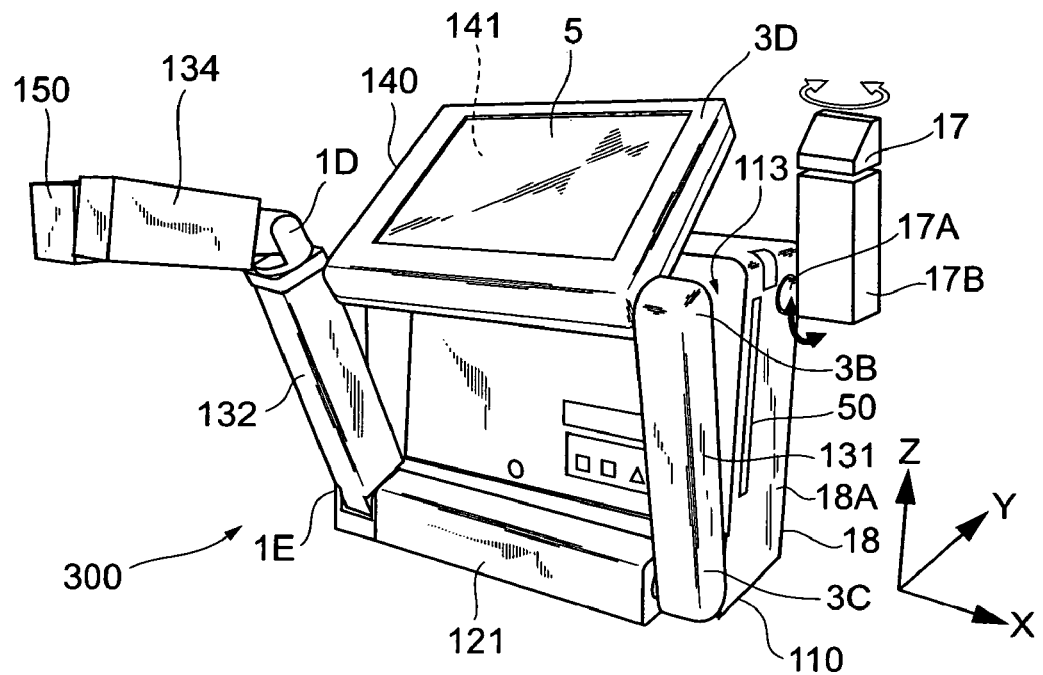
FIG. 11A is an isometric view of a document presentation device according to the second embodiment of the present invention.
Figure 11B:
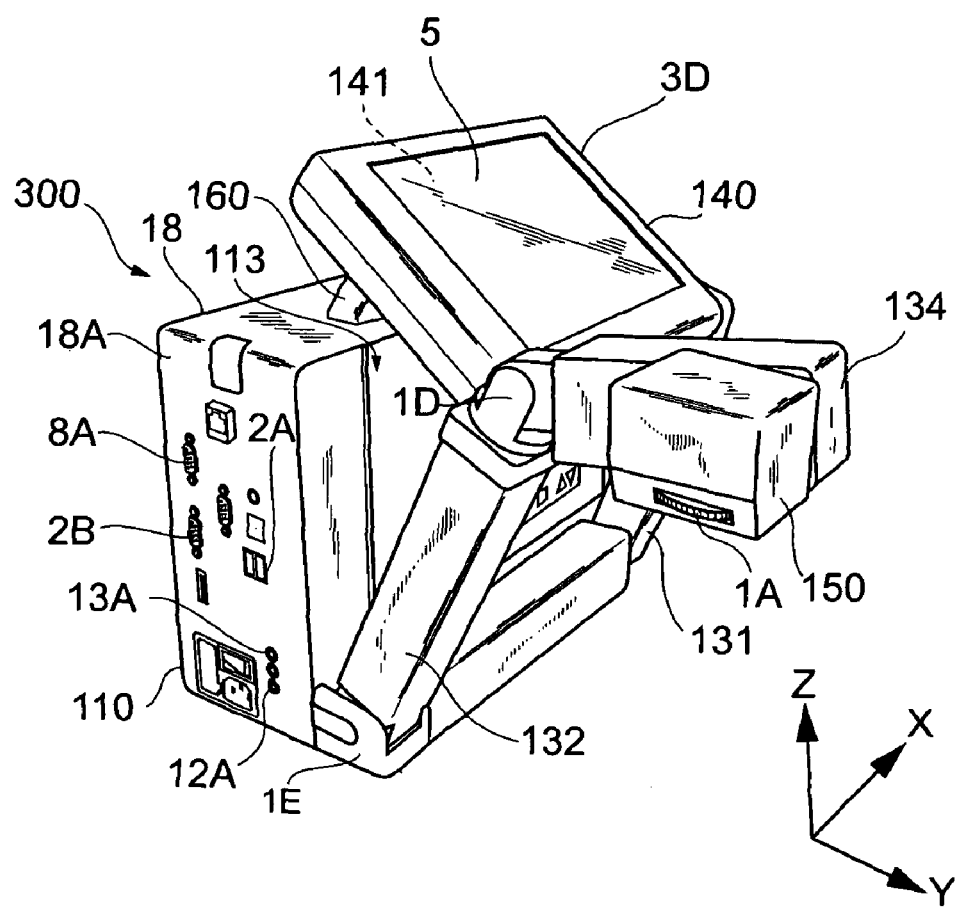
FIG. 11B is an isometric view of a document presentation device according to the second embodiment of the present invention.

In the following a document presentation device according to a second embodiment of the present invention is explained, using FIGS. 10, 11A, 11B, 12A, 12B, and 12C. As shown mainly in FIGS. 11A, 11B, 12A, 12B, and 12C, a document presentation device 300 according to the second embodiment includes the essential characteristics of the physical configuration of the document presentation device 100 according to the above first embodiment. FIG. 10 is a block diagram of the document presentation device 300 according to the second embodiment. Also, FIG. 11 A is an isometric view of the document presentation device 300 set in the attitude to be used. FIG. 11B is an isometric view seen from a different direction to that of FIG. 11A.

Figure 12A:
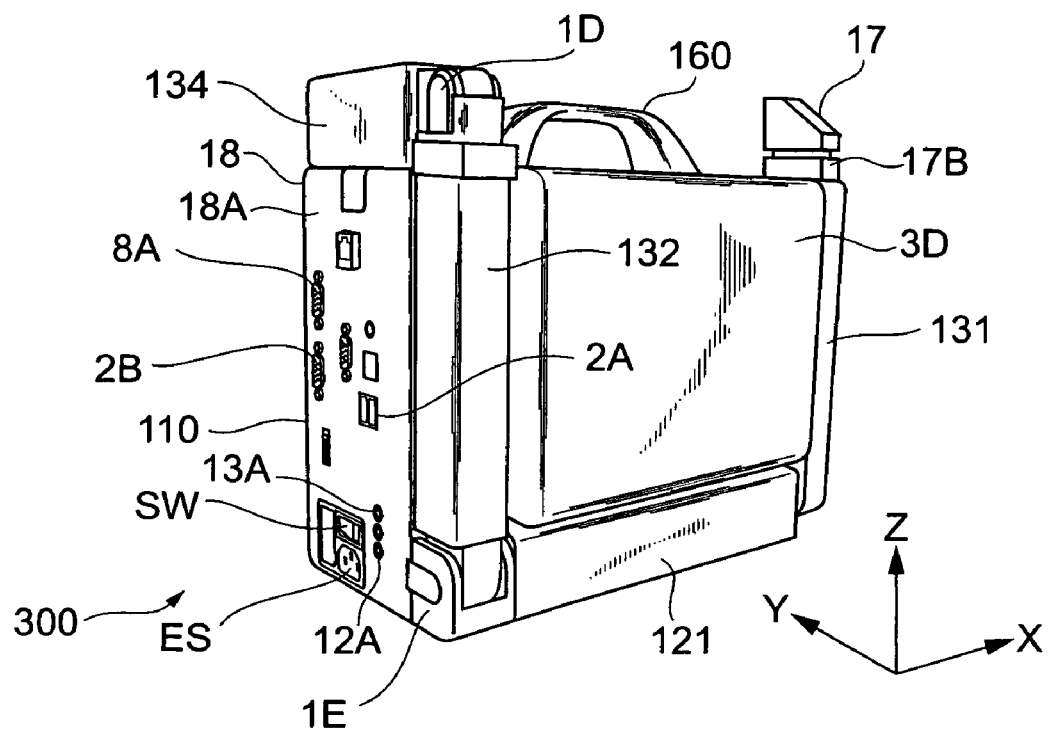
FIG. 12A is an isometric view of a document presentation device according to the second embodiment of the present invention.
Figure 12B:
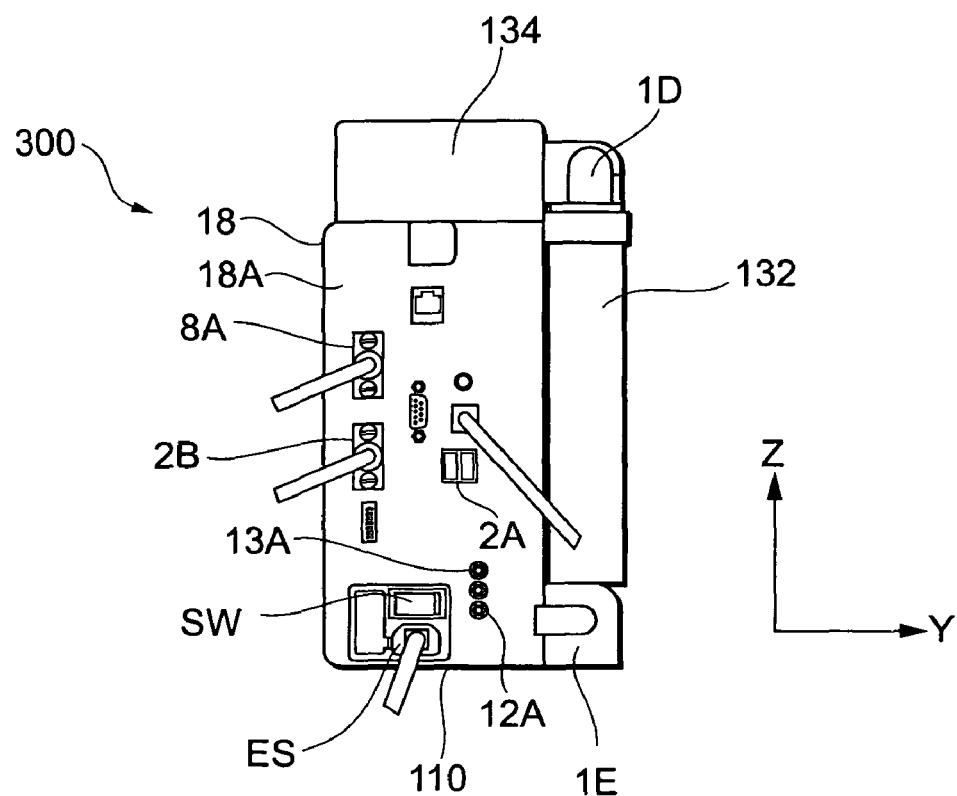
FIG. 12B is a side view of a document presentation device according to the second embodiment of the present invention.
Figure 12C:
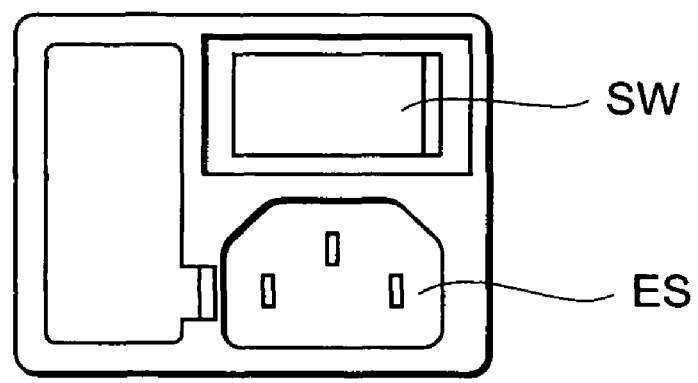
FIG. 12C is an enlarged view of a document presentation device according to the second embodiment of the present invention.
Figure 13:
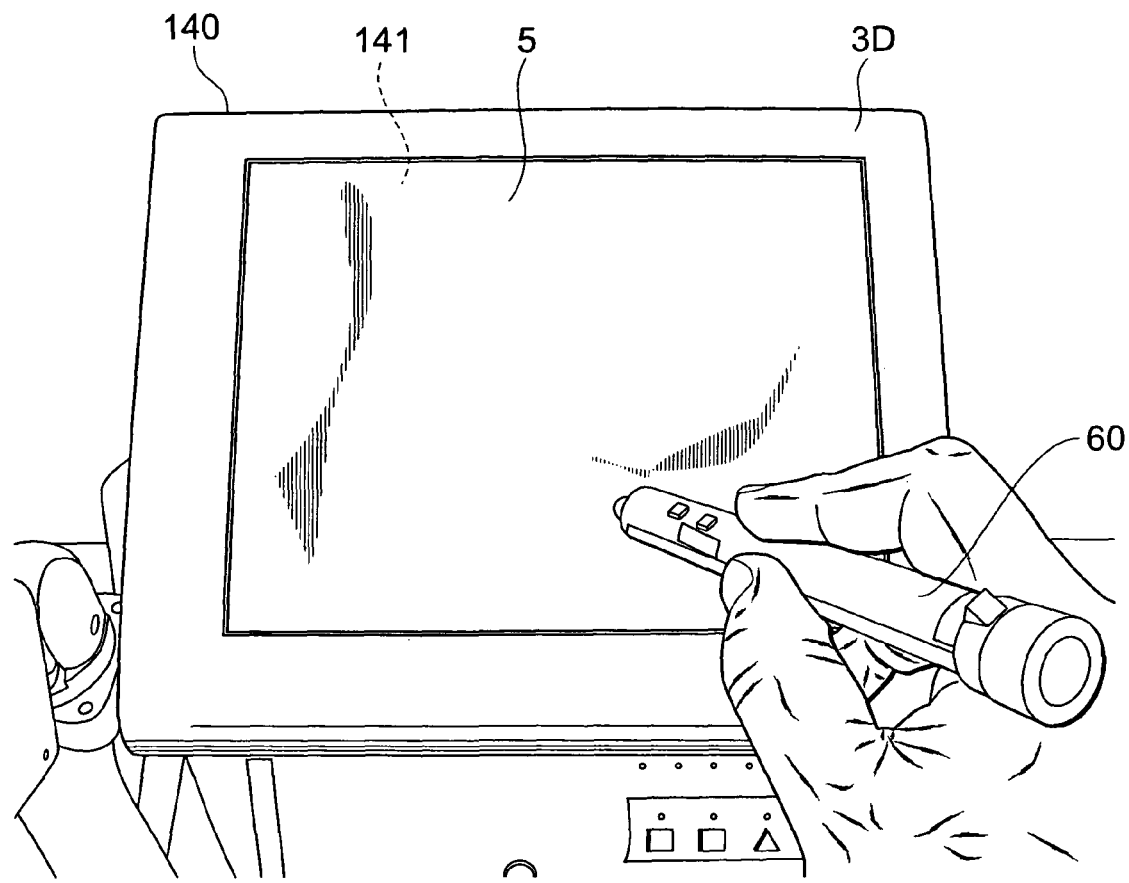
FIG. 13 is a view showing instructions being input on the display of a document presentation device according to the second embodiment of the present invention.
Figure 14:
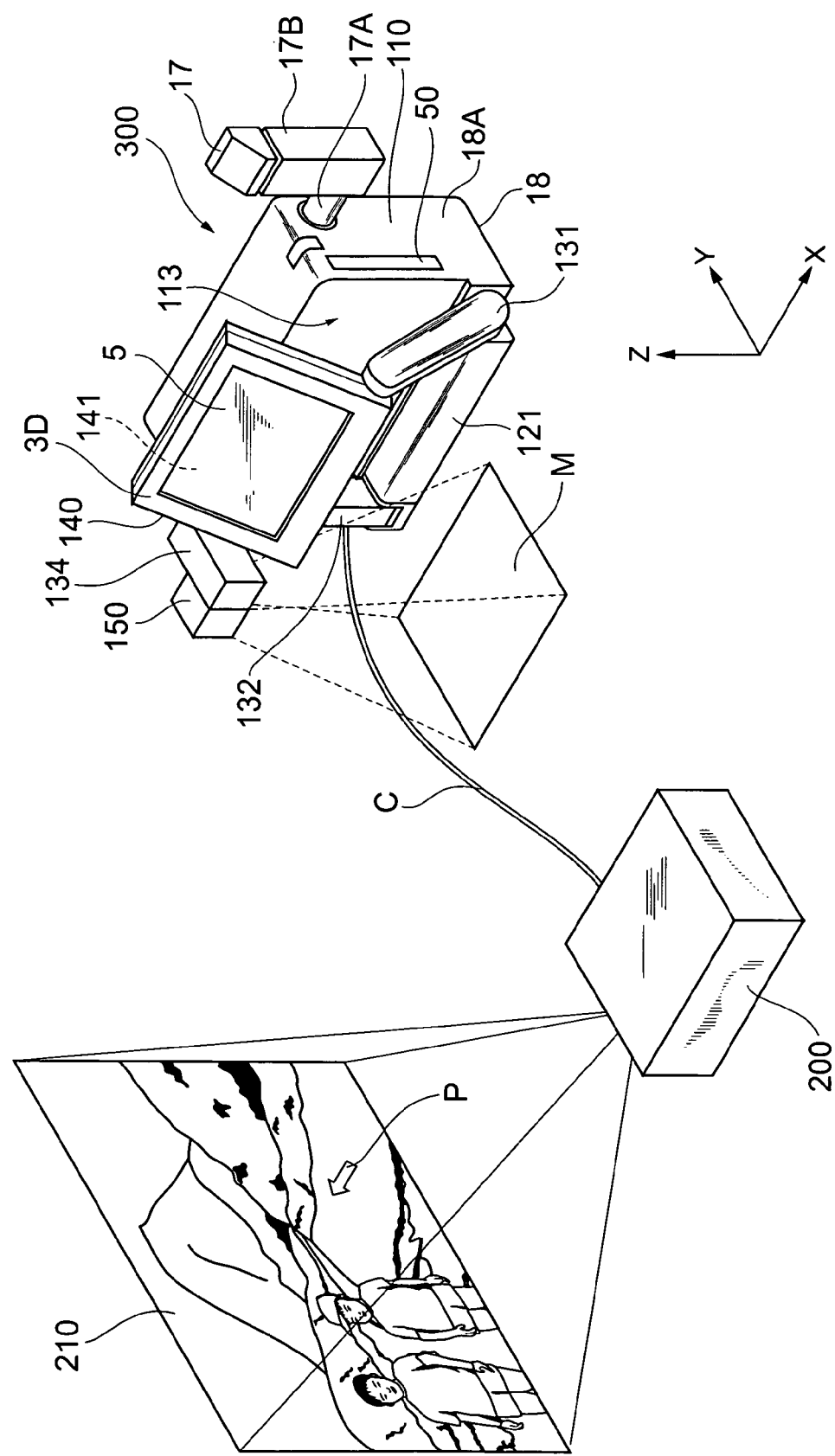
FIG. 14 is a view showing a document presentation device according to the second embodiment of the present invention connected to a projector.

Also, FIG. 12A is an isometric view of the document presentation device 300 in the storage condition. FIG. 12B is a side view of the document presentation device 300 in the storage condition of FIG. 12A connected to a pointing input device (for example, a personal computer). FIG. 12C is an enlarged view of FIG. 12B near a power switch SW and a power socket ES. Also, FIG. 13 is a figure showing instructions being input on the display 140 using for example a pen 60 for input. Also, FIG. 14 shows the document presentation device 300 connected to a projector 200, with image information projected on the projection area (in other words, the projected area) of a screen 210. The document presentation device 300 is used for presenting documents at meetings for example.

The document presentation device 300 includes as functional constituent elements the imaging unit 150 (in other words, a camera), an information input unit 2, the display 140, a switching unit 4, a touch panel 5, a superposition unit 6, an operation unit 7, an information output unit 8, an image processing unit 9, a memory unit 10, an editing unit 11, a sound input unit 12, a sound output unit 13, a code reading unit 14, a code output unit 15, a control unit 16, and a projector unit 17.

The imaging unit 150 is a camera capable of taking an image of a document. As shown in FIG. 11A and FIG. 11B, the imaging unit 150 is connected to a first end of the arm 134 (in other words, the camera arm) so that the imaging unit 150 can rotate about a rotation axis (not shown in the drawings). Therefore by rotating the imaging unit 150 about the rotation axis images can be taken around the document presentation device 300. Also, the second end of the arm 134 is connected to the upper end of the arm 132 (in other words, the camera arm), so that the arm 134 can rotate about a rotation axis 1D. Furthermore, the lower end of the arm 132 is connected to the hinge mechanism 121 (in other words, the support platform) of the document presentation device 300 so that the arm 132 can rotate about a rotation axis 1E. The support platform of the document presentation device 300 is connected to a side wall 18A of the main body 18 of the document presentation device 300. The main body 18 has the camera 150 and the display 140. The imaging unit 150 has a focusing ring 11A, and by rotating the focusing ring 1A it is possible to focus on the document being imaged. Furthermore, by rotating the arm 134 and the arm 132 about their respective rotation axes as described above and adjusting the distance from the arm 134 to the surface on which the document presentation device 300 is installed, the image size can be increased by up to a factor of 4. The image information taken by the imaging unit 150 is sent to the switching unit 4.

The information input unit 2 is the part that inputs document information from a document input device, and includes for example a USB terminal 2A, or an RGB input terminal 2B. The information input unit 2 is provided in the side wall 18A of the main body 18 of the document presentation device 300. The document input device is for example a personal computer or similar used secondarily when making a presentation. Document information input by the information input unit 2 is sent to the switching unit 4.

The display panel 141 on the display 140 is the part that displays either static images or moving images of the image information taken by the imaging unit 150 or the document information input by the information input unit 2. The display panel 141 of the display 140 is provided within a display frame 3D that forms the outer frame of the display panel 141, as shown in FIG. 11A and FIG. 11B. The display frame 3D is connected to the upper end of the arm 131 so that the display 140 can rotate about a rotation axis 3B. Also, the lower end of the arm 131 is connected to the hinge mechanism 121 of the document presentation device 300 so that the arm 131 can rotate about a rotation axis 3C. The support platform of the document presentation device 300 is connected to a side wall 18A of the main body 18 of the document presentation device 100. The display panel 141 can be set to a position that is easy to view by rotating the arm 131 about the rotation axis. The touch panel 5 is installed in the display portion of the display panel 141. Users of the document presentation device 300 can visually confirm the information displayed on the display panel 141.

The switching unit 4 is a part that switches the information displayed on the display panel 141 to either image information or document information. In other words, using the switching unit 4 it is possible to switch between displaying image information taken by the imaging unit 150 and displaying document information input by the information input unit 2. By touching an input switching mark 7A that is described later, users of the document presentation device 300 can switch the information displayed on the display panel 141 between image information and document information. Also, the switching unit 4 is provided as an input switching button 151 on a remote controller 350, described later, of the document presentation device 300. A signal that determines whether to display image information or to display document information on the display panel 141 is sent to the control unit 16.

The touch panel 5 is a panel that receives instructions input with respect to the display panel 141. In other words, the touch panel 5 is an input device installed on the surface of the display panel 141, and may be either a pressure sensitive or electrostatic type. As shown in FIG. 13, users of the document presentation device 300 can input instructions with respect to the display panel 141 by touching the touch panel 5 with an input pen 60 provided with the device. Also, users of the document presentation device 300 can input instructions without using an input pen 60 by touching the touch panel 5 directly with their finger, or similar. Operation marks (for example, the above switching mark, and so on) are displayed on the touch panel 5 corresponding to instructions for each function with respect to the display panel 141. In other words, the touch panel 5 includes operation marks for carrying out operations with respect to the image information or document information displayed on the display panel 141. In this way users of the document presentation device 300 can execute functions corresponding to the operation marks by touching and selecting an operation mark. Instructions input to the touch panel 5 are sent to the control unit 16.

The superposition unit 6 is a part that superimposes an instruction received by the touch panel 5 as a graphic symbol on the display panel 141. The superposition unit 6 is configured from software, for example. The superposition unit 6 superimposes arrow symbols, straight lines, curved lines, and the like, as graphic symbols on the display panel 141. An example of an arrow graphical symbol is an arrow shaped pointer or similar for pointing out a subject. Also, an example of a straight line graphic symbol is a horizontal line or a vertical line passing through a specific point on the display panel 141. Also, an example of a curved line graphic symbol is a curved line drawn free-hand by a user on the document presentation device 300. Information regarding graphic symbols superimposed by the superposition unit 6 is sent to the control unit 16.

Figure 15:
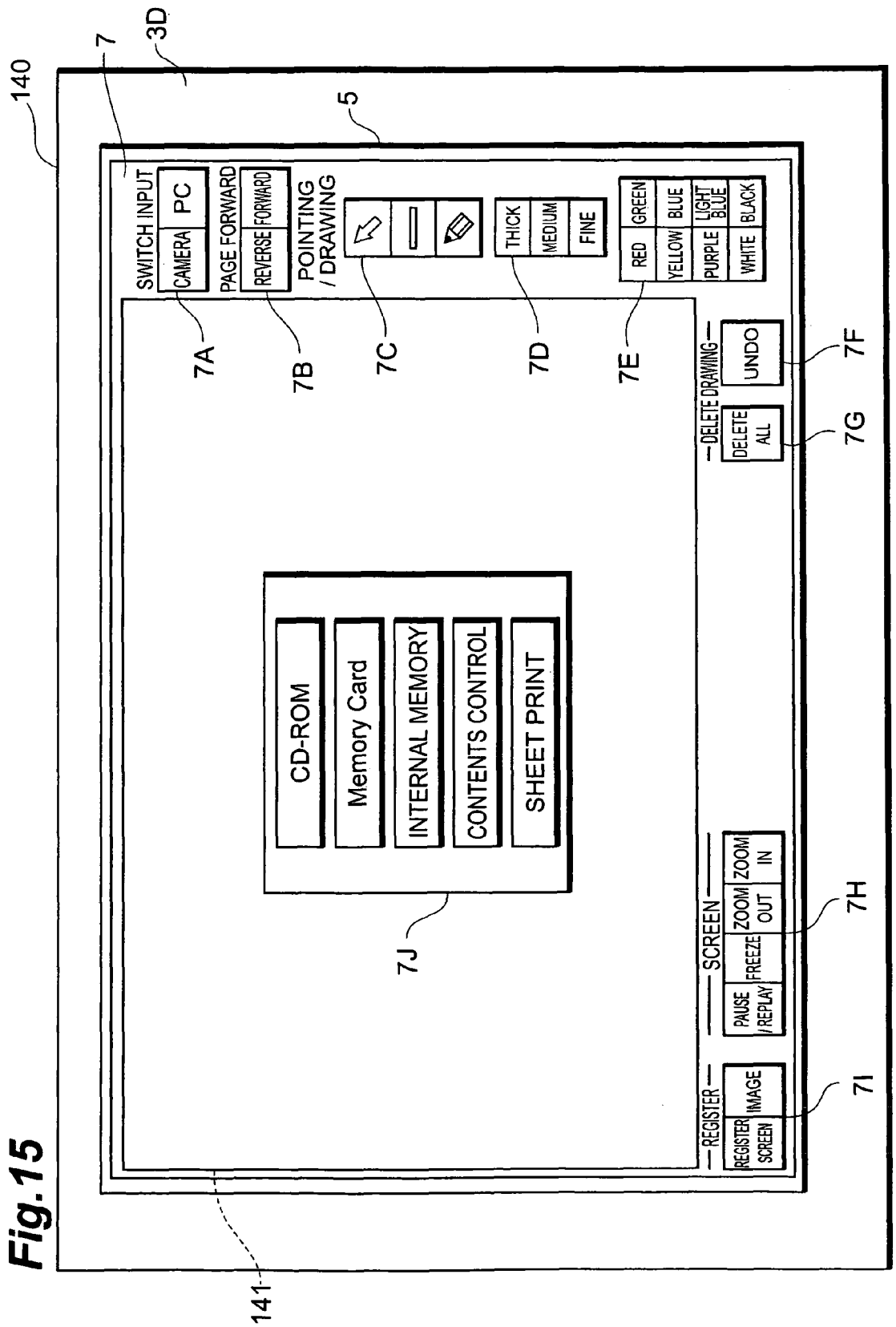
FIG. 15 is a display screen of the touch panel of a document presentation device according to the second embodiment of the present invention.

The operation unit 7 includes operation marks (for example, the above input switching mark 7A or similar) for carrying out operations on image information or document information displayed on the display panel 141, and is included in the touch panel 5, as stated above. More specifically, the operation unit 7 is provided within the inner edges of the touch panel 5 (in other words, the part within the inner edges), as shown in FIG. 15. The size of the display panel 141 is smaller than the size of the touch panel 5. Each operation mark in the touch panel 5 is described later. The operation unit 7 sends information regarding operations received from users of the document presentation device 300 to the superposition unit 6 via the touch panel 5.

The information output unit 8 outputs the image information or document information displayed on the display panel 141 together with the graphic symbols to an image display device, for example an RGB output terminal 8A. The information output unit 8 is provided on the side wall 18A of the main body 18 of the document presentation device 300. The image display device can be for example a projector or similar used secondarily when carrying out a presentation. As shown in FIG. 14, the information output unit 8 of the document presentation device 300 is connected to the projector 200 by a cable C, so for example image information of a document M taken by the imaging unit 150 can be projected onto a screen 210. An arrow shaped pointer P superimposed on the display panel 141 is displayed on the screen 210.

The image processing unit 9 carries out image processing on image information or document information. The image processing unit 9 is configured as software, for example. Image processing such as zooming in or zooming out can be carried out by the image processing unit 9. Operation marks for carrying out image processing operations are displayed in the touch panel 5, as stated above. Image processed information processed by the image processing unit 9 is sent to and displayed on the display panel 141, via the control unit 16.

The memory unit 10 records image information or document information displayed on the display panel 141. The memory unit 10 is configured mainly from for example a computer including a CPU and a hard disk.

The editing unit 11 edits information recorded in the memory unit 10. The editing unit 11 is configured mainly from a computer including a CPU and editing software. Information regarding editing by the editing unit 11 of information recorded in the memory unit 10 is sent to the memory unit 10.

The sound input unit 12 receives input of sound in respect of image information or document information, and can be for example a microphone input terminal 12A or similar. The sound input unit 12 is provided in the side wall 18A of the main body 18 of the document presentation device 300. Sound information received as input by the sound input unit 12 is sent to the control unit 16.

The sound output unit 13 outputs sound for the image information or document information, and is for example a sound output terminal 13A or similar. The sound output unit 13 is provided in the side wall 18A of the main body 18 of the document presentation device 300. By connecting the sound output unit 13 to a speaker (not shown in the drawings), it is possible to output the sound for image information or document information. The sound output unit 13 can output sound for image information or document information before sound input processing by the sound input unit 12. Also, the sound output unit 13 can output sound for image information or document information after sound input processing by the sound input unit 12.

The code reading unit 14 reads identification codes allocated to image information or document information displayed in the display panel 141 for identifying the image information or document information, using the imaging unit 150 or the remote control 350. Examples of identification codes include bar codes or QR codes (registered trademark), or similar. Information regarding identification codes read by the code reading unit 14 is sent to the control unit 16. As a result the image information or document information corresponding to the identification code is displayed on the display unit 141.

The code output unit 15 outputs the identification codes allocated to image information or document information displayed on the display panel 141 in order to identify the image information or document information to a printing device (not shown in the drawings). The code output unit 15 is provided in the side wall 18A of the main body 18 of the document presentation device 300. In this way the identification codes can be printed by a printing device. When printing using a printing device, the output may be printed onto paper or a seal, the medium onto which the identification codes are printed is not particularly limited.

The control unit 16 controls the display on the display panel 141 of the image information or document information, controls the output of sound for the image information or document information, and the like. The control unit 16 is configured mainly with a computer including CPU and memory.

A first rotatable body 17A is a cylindrical shaped body provided projecting from the side wall 18A of the main body 18 so that the first rotatable body 17A can rotate freely (in other words, can rotate freely as shown by the black arrow symbol in FIG. 11A) about the direction of projection (hereafter referred to as the projection direction X). Here the projection direction X of the first rotatable body 17A means the axial direction of the cylindrical first rotatable body 17A. One end of the first rotatable body 17A is inserted in the side wall 18A of the main body 18. In this way, bodies or similar installed on the other end of the first rotatable body 17A can freely rotate within a plane parallel to the side wall 18A of the main body 18.

A second rotatable body 17B is a cylindrical shaped rotatable body provided on the other end of the first rotatable body 17A. The second rotatable body 17B can freely rotate (in other words, rotate freely as shown by the white arrow symbol in FIG. 11A) about a direction perpendicular to the projection direction X of the first rotatable body 17A (in the following the vertical direction Z or the horizontal direction Y are assumed). The second rotatable body 17B supports a projector unit 17. Here the vertical direction Z of the second rotatable body 17B means the axial direction of the second rotatable body 17B when the axial direction of the cylindrical second rotatable body 17B is parallel to the vertical direction in FIG. 11A. The horizontal direction Y of the second rotatable body 17B means the axial direction of the second rotatable body 17B when the axial direction of the cylindrical second rotatable body 17B is parallel to the horizontal direction in FIG. 11A. At one end of the second rotatable body 17B, the other end of the first rotatable body 17A is inserted into the second rotatable body 17B. Also, the projector unit 17 is supported on the other end of the second rotatable body 17B. The direction perpendicular to the projection direction X of the first rotatable body 17A is not particularly limited, as long as it is perpendicular to the projection direction X.

In this way, the projector unit 17 supported by the other end of the second rotatable body 17B can rotate freely in a plane perpendicular to the side wall 18A of the body 18. In other words, when the axial direction of the second rotatable body 17B is parallel to the vertical direction of FIG. 11A, the projector unit 17 can rotate freely in a plane that includes the horizontal direction Y and the projection direction X. Also, when the axial direction of the second rotatable body 17B is parallel to the horizontal direction of FIG. 11A, the projector unit 17 can rotate freely in a plane that includes the vertical direction Z and the projection direction X.

The projector unit 17 projects image information or document information displayed on the display 140 together with the graphic symbols onto a projection area (in other words, the area on which the information is projected) such as the screen 210 or white wall surface or similar. As shown in FIG. 11A, the projector unit 17 is connected to the other end of the second rotatable body 17B so that the projector unit 17 can rotate about for example the vertical Z direction. Therefore the projector 17 can project around the document presentation device 300 by rotating the projector unit 17 about the vertical Z direction. Also, the first end of the second rotatable body 17B is connected to the other end of the first rotatable body 17A so that the second rotatable body can rotate about the projection direction X. The projector unit 17 has a focusing ring (not shown in the drawings), and by rotating this ring it is possible to focus when projecting onto a screen 210. Furthermore, it is possible to project to many locations and directions by rotating the first rotatable body 17A about the projection direction X, and rotating the second rotatable body 17B about the above Y and Z directions to adjust the projection direction of projecting by the projector unit 17.

(2-2) Explanation of Operation Marks

Next, the operation and other marks displayed on the touch panel 5 incorporated in the surface of the display panel 141 are explained using FIG. 15. FIG. 15 shows the display screen of the touch panel 5 when a user of the document presentation device 300 selects the image registration mark and a medium control screen 7J is displayed in the display panel 141. First each operation mark in the touch panel 5 is explained. Operation marks include the switching mark 7A (switching unit 4), a page forward mark 7B, a pointing/drawing mark 7C (superposition unit 6), a pointer thickness adjustment mark 7D, a pointer color selection mark 7E, an undo mark 7F, a delete all mark 7G, a screen operation mark 7H, and a registration operation mark 71. The input switching mark 7A includes a camera mark and a PC mark. If the camera mark is selected image information taken by the imaging unit 150 can be displayed in the display panel 141. Also, if the PC mark is selected document information input by the information input unit 2 can be displayed in the display panel 141. In this way, input switching can be easily carried out by using the camera mark and the PC mark appropriately.

The page forward mark 7B includes a reverse and a forward mark. If several presentation documents in the form of image information or document information are displayed in the display panel 141, when the reverse mark is selected the previous document can be displayed. Also, when the forward mark is selected, the next document can be displayed. In this way, by using the reverse and forward marks as appropriate, the presentation document can be easily moved forward or reversed.

The pointing/drawing mark 7C includes a pointer mark, a line mark, and a drawing mark. When a presentation document is displayed in the display panel 141, if the pointer mark is selected an arrow shaped pointer can be displayed superimposed on the display panel 141. Also, if the line mark is selected, a horizontal line passing through a point specified on the touch panel 5 can be displayed superimposed on the display panel 141. If the line mark is selected again, a vertical line passing through a point specified on the touch panel 5 can be displayed superimposed on the display panel 141. Also, if the drawing mark is selected, a pencil mark with which a user of the document presentation device 300 can draw graphics (for example, curved lines, or similar) freehand on the touch panel 5 is displayed in the display panel 141. In this way, by using the pointer mark, the line mark, or the drawing mark as appropriate, presentations can be easily carried out using these pointers and marks.

The pointer thickness adjustment mark 7D includes a thick mark, a medium mark, and a fine mark. When horizontal or vertical lines are displayed as described above, if the thick mark is selected the line can be displayed thick. Also, if the fine mark is selected the line can be displayed fine. Also, if the medium mark is selected, a line whose thickness is intermediate between the thickness when the thick mark is selected and the thickness when the fine mark is selected can be displayed. In this way, by using the thick mark, the medium mark, and the fine mark as appropriate, the thickness of the line mark can be easily adjusted. The pointer thickness adjustment mark 7D may also be capable of adjusting the thickness of the line drawn when the above drawing mark is selected. Also, the thick mark, the fine mark, and the medium mark of the pointer thickness adjustment mark 7D may also have the function of changing the size of the arrow shaped pointer to a large arrow symbol, a small arrow symbol, and an arrow symbol intermediate in size between the large arrow symbol and the small arrow symbol.

The pointer color selection mark 7E includes eight marks: red, yellow, purple, white, green, blue, light blue, and black. When displaying the arrow shaped pointer, horizontal line, or vertical line, if these color marks are selected the color of the pointer or line can be changed to the color indicated on the selected mark. In this way, by using the pointer color selection mark 7E, the color of the pointer or line can be easily selected and changed. The pointer color selection mark 7E may also change the color of lines drawn when the drawing mark is selected.

The undo mark 7F is an operation mark that, for figures drawn by selecting the drawing mark and drawing several times, deletes one time's worth of drawing process for every time that the undo mark is selected. A figure drawn from when the input pen 60 starts to touch the touch panel 5 until the input pen 60 is separated from the touch panel 5 is counted as one time's worth of drawing process.

The delete all mark 7G is an operation mark that deletes all figures displayed on the display panel 141 as a result of drawing by selecting the drawing mark.

The screen operation mark 7H includes a pause/replay mark, a freeze mark, a zoom out mark, and a zoom in mark. When the presentation document displayed in the display panel 141 is a moving image, replay of the moving image can be paused by selecting the pause/replay mark. If the pause/replay mark is selected again, replay of the moving image can be restarted. Also, if the freeze mark is selected, the image information or document information displayed in the display panel 141 at that instant can be displayed in the display panel 141 as a static image. The zoom out and zoom in marks include the image processing unit 9. If the zoom in mark is selected, the image information or document information is enlarged (with enlargement ratios of for example 1, 2, 3, or 4 times) and displayed in the display panel 141. In this way, presentation documents can be paused or played, and image processing or similar can be easily carried out by using the screen operation mark 7H.

The registration operation mark 7I includes an image mark and an image registration mark. When the presentation document is a moving image displayed in the display panel 141, the image information or document information displayed in the display panel 141 can be read into the memory unit 10 and recorded as moving image data. On the other hand, if several presentation documents are displayed in the display panel 141 as static images, if the image mark is selected the image information or document information can be read into the memory unit 10 and recorded as static image data. Also, if the image registration mark is selected, the medium control screen 7J is displayed in the display panel 141.

The medium control screen 7J includes a CD-ROM mark, a memory card mark, an internal memory mark, a contents control mark, and a sheet print mark. If the CD-ROM mark is selected, a list of document information recorded in a CD-ROM installed in a CD-ROM drive 50 provided in the document presentation device 300 is displayed. Also, if the memory card mark is selected, a list of document information recorded on an external memory card installed in a memory card slot provided in the document presentation device 300 is displayed. Also, if the internal memory mark is selected, the still images referred to above temporarily recorded in internal memory provided in the document presentation device 300 is displayed. Also, if the contents control mark is selected, a list of document information recorded in the memory unit 10 is displayed as a tabulated list. Also, if the sheet print mark is selected, identification codes allocated to image information or document information is output to a printing device such as a printer or seal printer via the code output unit 15. In this way, identification codes can be printed as images, for example.

(2-3) Explanation of the Remote Control

Figure 16:
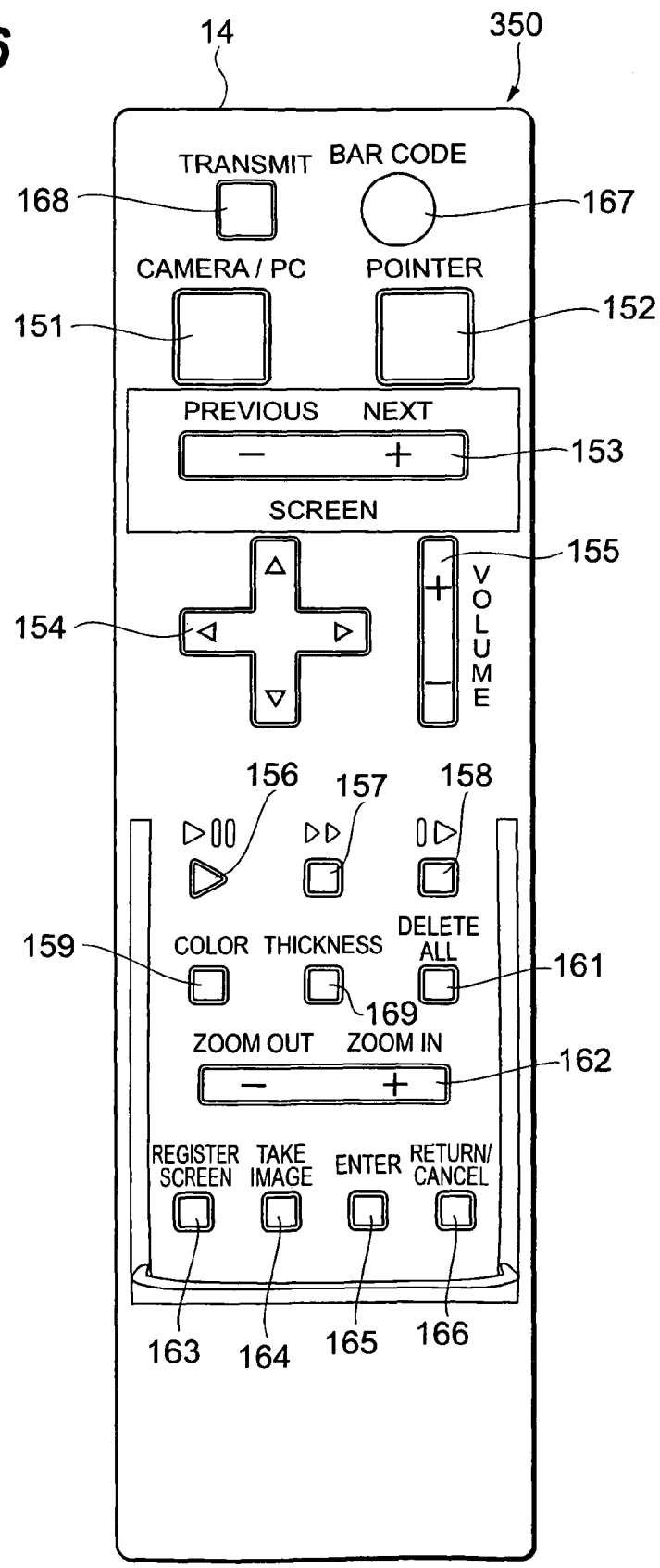
FIG. 16 is a plan view of a remote control for a document presentation device according to the second embodiment of the present invention.
Figure 17:
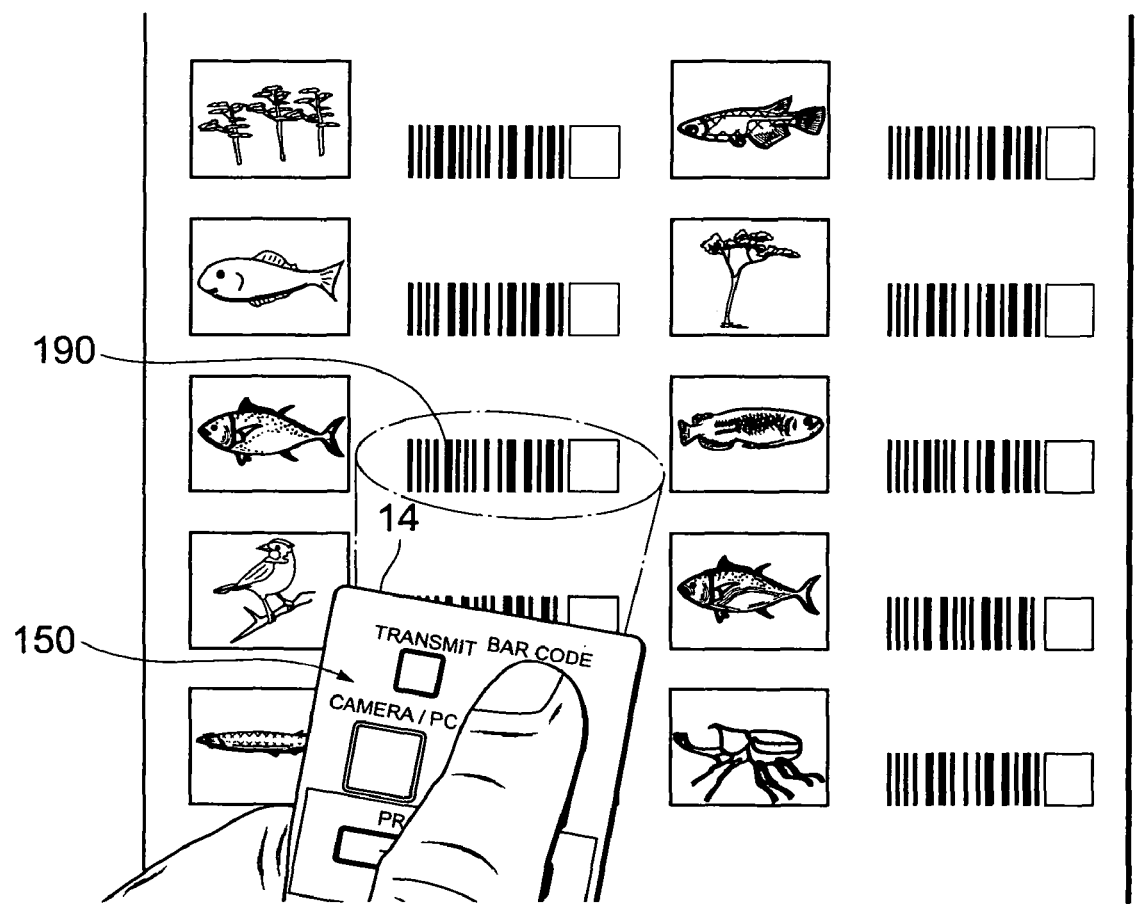
FIG. 17 is a view showing identification codes being read.

Next, the remote control, which assists in the use of the document presentation device 300, is explained using FIG. 16 and FIG. 17. FIG. 16 is a plan view of the remote control to explain the buttons provided on the remote control 350. Also, FIG. 17 is a diagram showing identification codes being read by bringing an identification code reader close to the identification codes. The remote control 350 is a device that operates the document presentation device 300 by wireless communication (for example, infrared communication).

The remote control 350 includes a camera/PC switching button 151, as shown in FIG. 16. Every time the input switching button 151 is pressed down it is possible to switch between displaying image information taken by the imaging unit 150 and document information input by the information input unit 2 (corresponds to the input switch mark 7A described above). Also, the remote control 350 includes a pointer button 152. It is possible to switch between the arrow shaped pointer, a horizontal line, a vertical line, and a pencil tool for freehand drawing every time the pointer button 152 is pressed down (corresponds to the above pointing/drawing mark 7C). Also, the remote control 350 includes a page forward button 153 that is long in the horizontal direction (left-right direction). Every time one end of the page forward button 153 (in other words, the right hand end facing the remote control 350) is pressed down the next document can be displayed. Also, every time the other end of the page forward button 153 (in other words, the left hand end facing the remote control 350) is pressed down the previous document can be displayed (corresponds to the page forward mark 7B described above).

Also, the remote control 350 includes a cross shaped key 154. A cursor that points to image information or document information listed on the display screen 141 is moved in accordance with the direction of one of the four projections of the cross shaped key 154 that is pressed down. By aligning the cursor with information that a user wants to read in and record in the memory unit 10, and pressing down an Enter button 165 that is described later, the information can be read into and recorded in the memory unit 10. Also, the remote control 350 includes a volume button 155 that is long in the vertical direction (up-down direction). Every time one end (in other words, the upper end facing the remote control 350) of the volume button 155 is pressed down, the volume of the sound of the image information or document information being replayed on the display panel 141 is increased by a predetermined amount. Also, every time the other end (in other words, the lower end facing the remote control) of the volume button 155 is pressed down, the volume of the sound of the image information or document information being replayed on the display panel 141 is reduced by a predetermined amount.

Also, the remote control 350 includes a pause button 156, a fast forward button 157, and a replay button 158. When several presentation documents are displayed in the display panel 141 as moving images, if the pause button 156 is pressed down replay of the moving image can be temporarily stopped, and if the replay button 158 is pressed down replay of the moving image can restart. Also, if the fast forward button 157 is pressed down, replay of the moving image can be fast forwarded.

Also, the remote control 350 includes a color button 159, a thickness button 169, and a delete all button 161. When the arrow shaped pointer, horizontal lines, vertical lines, or the pencil tool are displayed on the display panel 141, every time the color button 159 is pressed down the color of the pointer, or line, or tool can be changed in sequence (corresponds to the pointer color selection mark 7E). In the same way every time the thickness button 169 is pressed down the thickness of the line or the line drawn by the drawing tool can be changed in sequence (corresponds to the pointer thickness adjustment mark 7D). Also, when the delete all button 161 is pressed, figures drawn with the pencil tool that remain displayed on the display panel 141 can be all deleted (corresponds to the delete all mark 7G).

Also, the remote control 350 includes a zoom button 162 that is long in the horizontal direction (the left-right direction). Every time one end (in other words, the right hand end facing the remote control 350) of the zoom button 162 is pressed down, the image information or document information can be enlarged (enlargement factor for example 1, 2, 3, or 4 times) and displayed on the display panel 141. Also, every time the other end (in other words, the left hand end facing the remote control 350) of the zoom button 162 is pressed down, the image information or document information can be reduced and displayed on the display panel 141.

Also, the remote control 350 includes an image registration button 163, an image button 164, an Enter button 165, and a return/cancel button 166. When a presentation document is displayed in the display panel 141 as a moving image, if the image button 164 is pressed down, the image information or document information displayed in the display panel 141 can be read into and recorded in the memory unit 10 as moving image data. When a presentation document is displayed in the display panel 141 as a static image, if the image button 164 is pressed down, the image information or document information displayed in the display panel 141 can be read into and recorded in the memory unit 10 as static image data (corresponds to the image mark described above). Also, if the image registration button 163 is pressed down, the medium control screen 7J is displayed in the display panel 141. To select and confirm items displayed on the medium control screen 7J, the Enter button 165 is pressed down. Here, to cancel the image registration, the return/cancel button 166 is pressed down. Details of the medium control screen 7J have already been explained, so here they are omitted.

Also, the remote control 350 includes a transmit button 168 and a bar code button 167. The remote control 350 includes an identification code reader (not shown on the drawings) that can read the identification codes 190 (corresponds to the code reading unit 14 of the document presentation device 300). To start reading an identification code 190, the identification code reader is brought within a distance of 5 cm from the identification code 190, and the bar code button 167 is pressed down, as shown in FIG. 17. In this way reading is possible. Then by pressing down the transmit button 168, the identification code 190 that was read can be transmitted to the document presentation device 300 by wireless transfer. And, by pressing down the bar code button 167, the identification code 190 can be read and be transmitted to the document presentation device 300 by wireless transfer.

As explained above, in the document presentation device 300 according to the present embodiment, first an image of the document is taken by the imaging unit 150, then the image information of the image is displayed on the display panel 141 as either a static image or a moving image. Therefore users of the document presentation device 300 can easily make a presentation while the image information is displayed. Also, document information from a personal computer is input at the information input unit 2, and this input document information is displayed on the display panel 141 as either a static image or a moving image. Therefore users of the document presentation device 300 can easily make a presentation while the image information is displayed.

Also, it is possible to switch the information displayed on the display panel 141 between image information and document information, using the switching unit 4. Therefore users of the document presentation device 300 can easily make a presentation while switching the information displayed on the display panel 141. Also, input of instructions for the display panel 141 can be received by the touch panel 5, and these received instructions are superimposed on the display panel 141 in the form of arrow symbols, straight lines, curved lines, or similar, using the superposition unit 6. Therefore users of the document presentation device 300 can input instructions by touching the touch panel 5, and these instructions are superimposed on the display panel 141 in the form of the figures described above. As a result, the desired position of the touch panel 5 can be accurately pointed out, so presentations can be easily carried out while using these figures.

Also, image information or document information displayed on the display panel 141 is output to a projector 200 by the information output unit 8. Therefore, users of the document presentation device 300 output image information or document information displayed on the display panel 141 to a projector 200, and presentations can be easily carried out while this information is displayed by the projector 200. Also, image information or document information displayed on the display 140 is projected onto a screen 210 using the projector unit 17. Therefore, users of the document presentation device 300 project the image information or document information displayed on the display 140 onto the screen 210, and presentations can be easily carried out while this information is displayed on the screen 210.

As described above, the document presentation device 300 includes the imaging unit 150, the information input unit 2, the display panel 141, the switching unit 4, the touch panel 5, the superposition unit 6, the information output unit 8, and the projection unit 17, all integrated. Therefore the document presentation device 300 can be easily carried, also presentations can be easily carried out using many functions. As a result the troublesome work of providing and preparing several devices is unnecessary.

Also, the touch panel 5 includes the operation unit 7. Therefore display, replay, pause, slow replay, fast forward, fast reverse, and other operations can be carried out on the image information or document information displayed in the display panel 141 as static images or moving images, by the operation unit 7.

Also, the display panel 141 displays image processed information processed by the image processing unit 9. In this way users of the document presentation device 300 can easily make presentations while using this image processed information.

Also, the document presentation device 300 includes the memory unit 10 and the editing unit 11. Therefore image information or document information displayed in the display panel 141 can be recorded, and the recorded information can be edited.

Also, the touch panel 5 outputs instructions received by the touch panel 5 to an instruction input device (for example, a personal computer or the like). Therefore, by inputting instructions to the touch panel 5, operations (for example, double click or similar) as an input device, such as a mouse or similar, or instructions, including drawing or similar, can be carried out on the instruction input device.

Also, the document presentation device 300 includes a sound output unit 13 and/or a sound input device 12. Therefore sound for the image information or document information can be output, and/or sound can be input for the image information or document information.

Also, the display panel 141 can display image information or document information corresponding to identification codes read by the code reading unit 14. Therefore, users of the document presentation device 300 can easily make presentations while reading identification codes with the code reading unit 14, and displaying the image information or document information in the display panel 141.

Also, the document presentation device 300 includes a code output unit 15. Therefore users of the document presentation device 300 can print identification codes to a printer or seal printer, or similar. In this way, users of the document presentation device 300 only have to prepare the printed identification codes when carrying out a presentation. Also, the user can easily carry out presentations by just reading the identification codes with the code reading unit 14, and displaying the image information or document information on the display panel 141.

Also, when housing each part of the document presentation device 300, the display 140 is housed in the depression 113 formed on the front surface of the main body 110 by the hinge mechanism 121, the arm 132, and the arm 131. Also, the imaging unit 150 is arranged on the top surface of the main body 110. Therefore the hinge mechanism 121, the arm 132, the arm 131, the imaging unit 150, and the display 140 do not project from the front surface of the main body 110, so the appearance of the document presentation device 300 when all the parts are housed is good. Also, all the parts of the document presentation device 300 can be compactly housed, so the storage space of the document presentation device 300 can be reduced. Furthermore, projections do not impinge on the body of the person carrying the document presentation device 300 as in a conventional device, so the document presentation device 300 is easy to carry. On the other hand, projections do not impact the corner of desks or similar, so damage to the document presentation device 300 can be prevented.

Here, when using devices for carrying out presentations, conventionally the method of connecting a personal computer or similar external information device to a projection device such as a projector, and carrying out the presentation while images are projected has been used. For example, in the data projector with document camera disclosed in Japanese Patent Application Laid-open No. 2000-10189, the configuration is a personal computer connected to a projector by a cable. However, when making a presentation the operation of connecting the personal computer with a projector with a connection cable is necessary, and it is a problem that this connection operation is troublesome. Also, the installation location of the projector is limited. Furthermore, the projection direction of the projection lens installed in the projector is also limited. Therefore the installation position of the screen is also limited, time is required for changing documents, so it has the problem of inconvenience.

In contrast to this, the document presentation device 300 integrates the function of a personal computer (in other words, camera 150, information input unit 2, display 140, switching unit 4, touch panel 5, superposition unit 6, and information output unit 8) and a projector (in other words, the projector unit 17). Therefore, when making a presentation the operation of connecting a personal computer and a projector with a connection cable is unnecessary, so the convenience of carrying out a presentation can be increased.

Also, the document presentation device 300 includes the first rotatable body 17A and the second rotatable body 17B. In this way the second rotatable body 17B can freely rotate in a direction perpendicular to the direction of the projection direction X of the first rotatable body (for example, the vertical direction Z or the horizontal direction Y). Therefore the projector unit 17 supported on the second rotatable body 17B can freely rotate about the vertical direction Z or the horizontal direction Y. In other words, the projector unit 17 can freely rotate in a plane perpendicular to the side wall 18A of the main body 18. Also, the first rotatable body 17A is provided projecting from the side wall 18A of the main body 18, and in addition can freely rotate about the projection direction X. Therefore, the projector unit 17 supported by the second rotatable body 17B provided on the first rotatable body 17A can freely rotate about the projection direction X of the first rotatable body 17A. In other words, the projector unit 17 can freely rotate in a plane parallel to the side wall 18A of the main body 18.

In this way, the projector unit 17 can be arbitrarily moved in a free direction. Therefore, regardless of the position of the screen 210 (for example, above or below the document presentation device 300) projection can be easily carried out without affecting the work of changing documents, which improves the convenience. Furthermore, by making the projection direction perpendicular to the screen 210 it is possible to prevent distortion of the projected images (for example, distortion in which a rectangular shape is projected as a trapezoidal shape).

(2-4) Modified Embodiments

In the above the present invention was explained with reference to the second embodiment. However, the present embodiment is not limited to the second embodiment described above. For example, in the above second embodiment, instead of the CD-ROM drive 50, the document presentation device 300 may include a DVD-ROM drive. In this case, a list of the document information recorded on the DVD-ROM installed in the DVD-ROM drive can be displayed.

(3) The Third Embodiment

Figure 18:
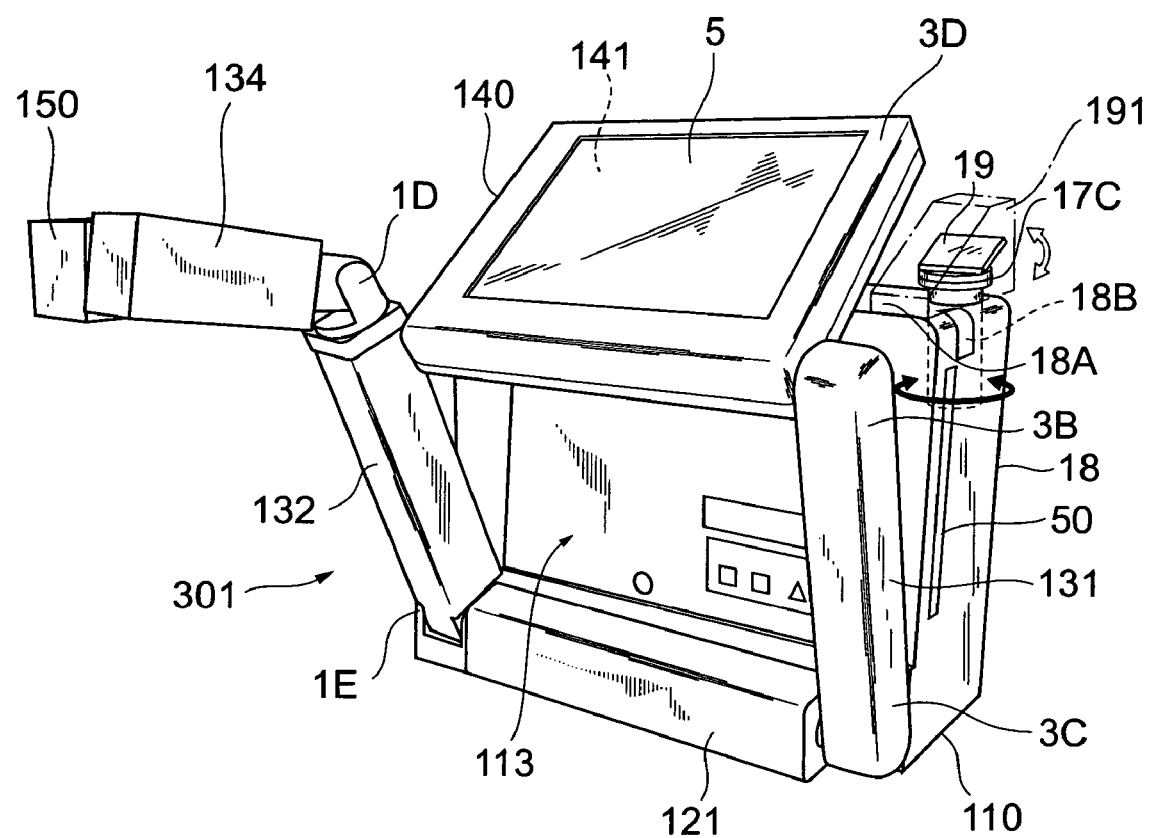
FIG. 18 is an isometric view of a document presentation device according to a third embodiment of the present invention.
Figure 19:
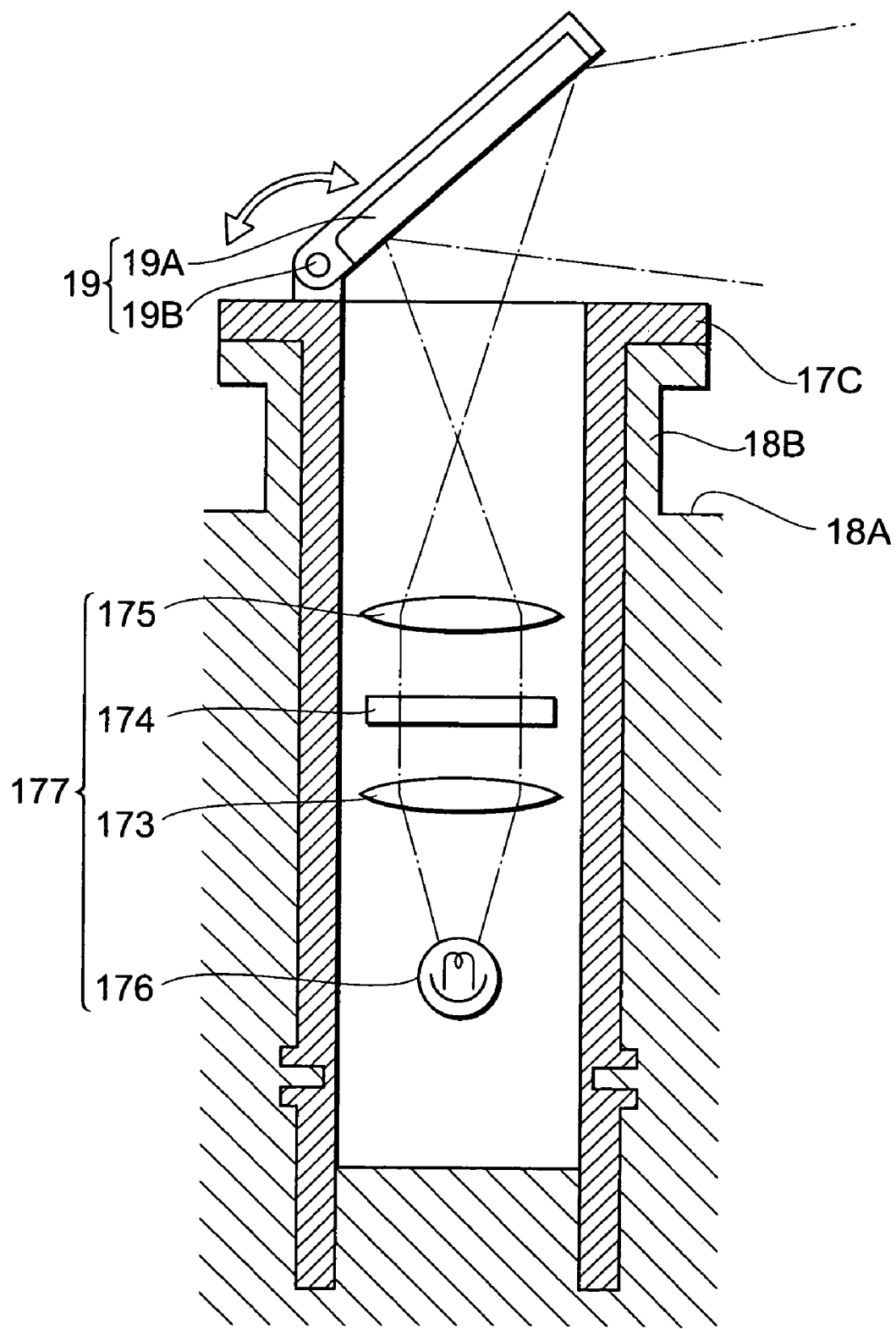
FIG. 19 shows a schematic configuration near a first rotatable body, the rotatable body support unit, the projector unit, and the opening and closing unit.

The following is an explanation of the document presentation device according to the third embodiment, using FIG. 18 and FIG. 19. FIG. 18 is an isometric view of a document presentation device 301 according to the present embodiment set in the attitude in which it can be used. The configuration of the document presentation device 301 is that of the document presentation device 300 excluding the first rotatable body 17A, the second rotatable body 17B, and the projector unit 17, and including a first rotatable body 17C, a rotatable body support unit 18B, a projector unit 177, an opening and closing unit 19, and a cover 191 that houses the opening and closing unit 19. Also, FIG. 19 shows the schematic configuration near the first rotatable body 17C, the rotatable body support unit 18B, the projector unit 177, and the opening and closing unit 19. FIG. 18 and FIG. 19 show the situation when the cover 191 is removed.

The first rotatable body 17C is a cylindrical shaped rotatable body projecting from a side wall 18A of the main body 18, capable of freely rotating about the projection direction (freely rotate in the direction indicated by the black arrow symbol in FIG. 18).

The cover 191 is integral with the first rotatable body 17C, and is capable of freely rotating about the projection direction of the first rotatable body 17C (freely rotate in the direction indicated by the black arrow symbol in FIG. 18). The cover 191 includes an opening (not shown in the drawings) so that the projector unit 177 can project image information or document information outside the document presentation device 301.

The rotatable body support unit 18B is a cylindrical shaped support unit (in other words, a thrust bearing unit) that projects from the side wall 18A of the main body 18 so as to cover the body of the first rotatable body 17C. The first rotatable body 17C is supported by the rotatable body support unit 18B through contact between the first rotatable body 17C and the inside of the rotatable body support unit 18B.

The projector unit 177 projects the image information or document information displayed on the display 140 to an optical mirror 19A which is the projection area of the opening and closing unit 19. The projector unit 177 is arranged inside the first rotatable body 17C. The projector unit 177 includes a light source 176, a condenser lens 173, a liquid crystal panel 174, and a projection lens 175, arranged in order of increasing distance from the side wall 18A of the main body 18. The liquid crystal panel 174 is connected to the display 140 by a connecting cable (not shown in the drawings), so that image information or document information displayed on the display 140 can be projected. The elements included in the projector unit 177 and the arrangement of these elements is conventionally known technology.

The opening and closing unit 19 is a plate shaped portion provided at one end of the first rotatable body 17C so that the opening and closing unit 19 can open and close. The opening and closing unit 19 includes the optical mirror 19A and a shaft member 19B. The shaft member 19B is supported and fixed at one end of the first rotatable body 17C, and is the rotational support member for opening and closing (in other words, rotating) the optical mirror 19A. Also, the optical mirror 19A is provided on the surface in confrontation with the projector unit 177 when the opening and closing unit 19 is closed. The optical mirror 19A is a reflecting surface that reflects incident light. The opening and closing unit 19 and the optical mirror 19A can freely rotate (freely rotate as shown by the white arrow in FIG. 18 and the white arrow in FIG. 19) about the shaft member 19B as rotational axis. By the opening and closing unit 19 making the opening and closing movement as shown by the white arrow in FIG. 18 and the white arrow in FIG. 19, the opening and closing unit 19 and the optical mirror 19A rotate. By this opening and closing movement, the direction of reflection of the image information or document information projected outside the document presentation device by the projector unit 177 is changed.

As explained above, in the document presentation device 301 according to the present embodiment, the direction of reflection of the image information or document information projected by the projector unit 17 outside the document presentation device 301 is changed by the opening and closing movement of the opening and closing unit 19. As a result, the direction of reflection of the image information outside the document presentation device 301 can be arbitrarily changed to a free direction. Also, the first rotatable body 17C is a cylindrical shaped rotatable body projecting from the side wall 18A of the main body 18, provided so that it can freely rotate (freely rotate in the direction of the black arrow in FIG. 18) about the projection direction. In this way, the opening and closing unit 19 provided on the first rotatable body 17C can freely rotate about the projection direction of the first rotatable body 17C. In other words, the direction of reflection of the image information or document information outside the document presentation device 301 can be freely rotated in a plane parallel to the side wall 18A of the main body 18.

As a result, the reflection direction of the image information or document information outside the document presentation device 301 can be arbitrarily changed in a free direction. Therefore, it is easy to project onto the screen 210 regardless of the position of the screen (for example, above or below the document presentation device 301). Furthermore, by making the projection direction perpendicular to the screen 210 it is possible to prevent distortion of the projected images (for example, distortion in which a rectangular shape is projected as a trapezoidal shape).

Also, when housing each part of the document presentation device 301, the display 140 is housed in the depression 113. Also, the imaging unit 150 is arranged on the top surface of the main body 110. Therefore the hinge mechanism 121, the arm 132, the arm 131, the imaging unit 150, and the display 140 do not project from the front surface of the main body 110, so the appearance of the document presentation device 301 when all the parts are housed is good. Also, all the parts of the document presentation device 301 can be compactly housed, so the storage space of the document presentation device 301 can be reduced. Furthermore, projections do not impinge on the body of the person carrying the document presentation device 301 as in a conventional device, so the document presentation device 301 is easy to carry. On the other hand, projections do not impact the corner of desks or similar, so damage to the document presentation device 301 can be prevented.

(4) The Fourth Embodiment

Figure 20:
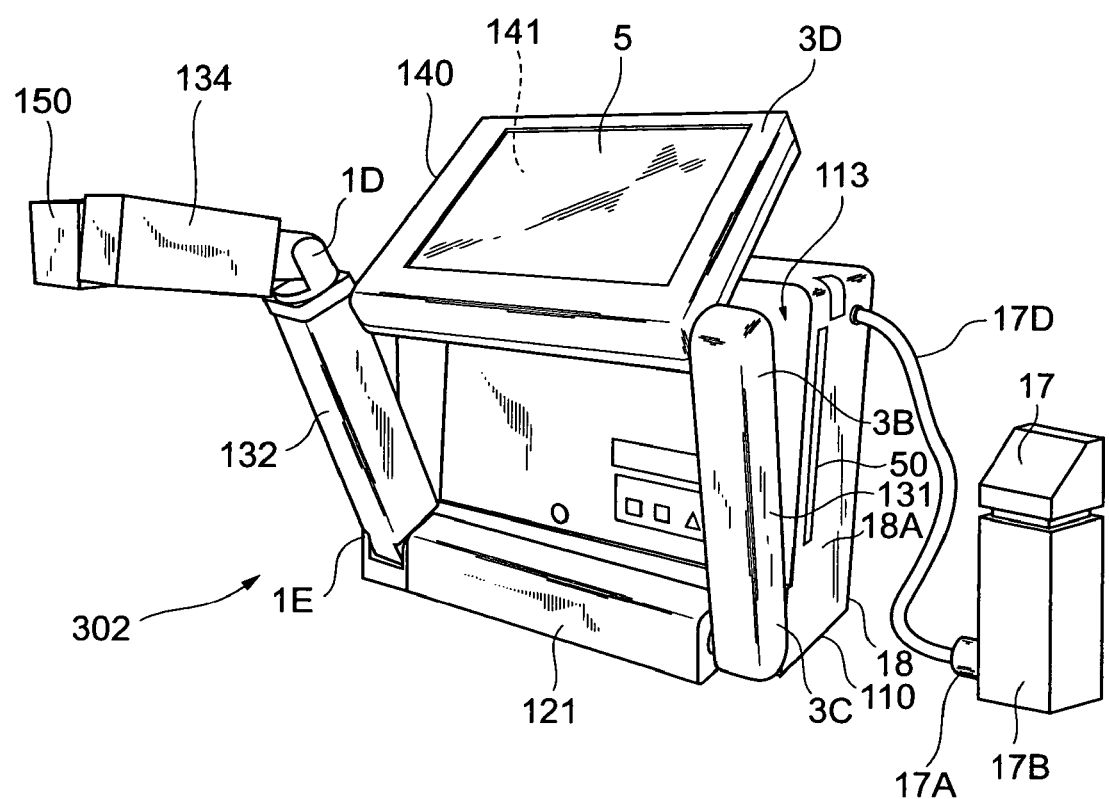
FIG. 20 is an isometric view of a document presentation device according to a fourth embodiment of the present invention.

A fourth embodiment of the document presentation device according to the present invention is explained using FIG. 20. FIG. 20 is an isometric view of a document presentation device 302 according to the present embodiment set in the attitude in which it can be used. The document presentation device 302 is the document presentation device 300 according to the second embodiment with the first rotatable body 17A separated from the side wall 18A of the main body 18, with the first rotatable body 17A and the side wall 18A of the main body 18 connected by a transmission cable 17D. One end of the transmission cable 17D passes through the first rotatable body 17A and the second rotatable body 17B and is connected to the projector unit 17. Also, the other end of the transmission cable 17D is connected to the control unit 16 within the document presentation device 302. As a result, the projector unit 17 and the control unit 16 are connected by the transmission cable 17D.

The transmission cable 17D is a cable connected to the projector unit 17 to project image information taken by the camera 150 or document information input by the information input unit 2 onto the screen 210. The transmission cable 17D transmits image information or document information stored within the document presentation device 302 to the projector unit 17 via the first rotatable body 17A and the second rotatable body 17B. Furthermore, the transmission cable 17D supplies electrical power that the projector unit 17 needs to project image information or document information onto the screen 210 from the document presentation device 302.

As explained above, in the document presentation device 302 according to the present embodiment, while the first rotatable body 17A is separated from the side wall 18A of the main body 18, image information taken by the camera 150 or document information input by the information input unit 2 can be projected by the projector unit 17 onto the screen 210. As a result, the projector unit 17 supported by the second rotatable body 17B provided on the first rotatable body 17A can be arbitrarily moved to a more free position. Therefore, regardless of the position of the screen 210 it is easy to project onto the screen 210. Also, apart from the transmission cable 17D connecting the first rotatable body 17A and the side wall 18A of the main body 18, connecting wires or connecting cables are not required, so the preparation work required to carry out a presentation can be reduced.

Also, when housing each part of the document presentation device 302, the display 140 is housed in the depression 113. Also, the imaging unit 150 is arranged on the top surface of the main body 110. Therefore the hinge mechanism 121, the arm 132, the arm 131, the imaging unit 150, and the display 140 do not project from the front surface of the main body 110, so the appearance of the document presentation device 302 when all the parts are housed is good. Also, all the parts of the document presentation device 302 can be compactly housed, so the storage space of the document presentation device 302 can be reduced. Furthermore, projections do not impinge on the body of the person carrying the document presentation device 302 as in a conventional device, so the document presentation device 302 is easy to carry. On the other hand, projections do not impact the corner of desks or similar, so damage to the document presentation device 302 can be prevented.

What is claimed is:

1. A document presentation device comprising:
an imaging unit that takes images of documents;
a display unit that displays the images of documents taken by the imaging unit;
a support unit provided on the front surface of a main body;
a first arm connected at the lower end thereof to a first end of the support unit; and
a second arm connected at the lower end thereof to a second end of the support unit rotatably so that the second arm can be tilted freely onto the front surface of the main body, wherein
the imaging unit is provided on the top surface of the first arm rotatably in the horizontal direction,
the display unit is provided on the upper end of the second arm rotatably,
the display unit can be housed in a concave portion formed on the front surface of the main body by the support unit, the first arm, and the second arm by rotating the second arm at the upper end thereof with respect to the front surface so that both are parallel and by tilting the second arm with respect to the front surface so that both are parallel, and
the imaging unit is arranged on the top surface of the main body by rotating the imaging unit on the top surface of the first arm in the horizontal direction.

2. The document presentation device according to claim 1, further comprising a grip on the top surface of the main body, wherein the imaging unit is housed in a concave portion formed by the top surface of the main body and the grip.

3. The document presentation device according to claim 1, wherein a concave portion for housing the imaging unit is formed in a corner of the top surface of the main body.

4. The document presentation device according to claim 1, wherein
the lower end of the first arm is connected to the first end of the support unit rotatably so that the first arm can be tilt freely with respect to the front surface, and
the imaging unit is connected to the top surface of the first arm so that the imaging unit can rotate freely in the same direction as the lower end of the first arm.

5. The document presentation device according to claim 1, wherein the imaging unit can slide freely in the vertical direction along the side surface of the first arm.

6. The document presentation device according to claim 1, wherein the first arm is flexible.

7. The document presentation device according to claim 1, further comprising a document loading platform, on which documents can be loaded, provided to be housed beneath the lower surface of the main body.

8. A document presentation device comprising:
a document loading platform, on which documents can be loaded, provided to be housed beneath the lower surface of a main body; and
an imaging unit that takes images of documents loaded on the document loading platform,
wherein the document loading platform can be folded and is positioned beneath the lower surface of a main body.

9. A document presentation device comprising:
a document loading platform, on which documents can be loaded, provided to be housed beneath the lower surface of a main body, wherein the document loading platform is capable of rotating and is positioned beneath the lower surface of the main body;
an imaging unit that takes images of documents loaded on the document loading platform;
a display unit that displays document images taken by the imaging unit;
an information input unit that inputs document information from a document output device, wherein
the display unit displays image information taken by the imaging unit or document information input into the information input unit as either static images or moving images,
the device integrally comprising:
a switching unit that switches the information displayed in the display unit between the image information and the document information;
a touch panel that receives input for instructions for the display unit;
a superposition unit that superimposes instructions received from the touch panel as figures on the display unit;
an information output unit that outputs the image information or document information displayed in the display unit to an image display device;
the imaging unit;
the information input unit; and
the display unit.

10. The document presentation device according to claim 9, wherein the touch panel includes an operation unit that carries out operations on the image information or document information displayed in the display unit.

11. The document presentation device according to claim 9, further comprising an image processing unit that carries out image processing on the image information or the document information, wherein
the display unit displays the image processed information that is image processed by the image processing unit.

12. The document presentation device according to claim 9, further comprising:
a memory unit that records the image information or document information displayed in the display unit; and
an editing unit that edits the information recorded in the memory unit.

13. The document presentation device according to claim 9, wherein the touch panel outputs the instructions received by the touch panel to an instruction input device.

14. The document presentation device according to claim 9, further comprising:
a sound output unit that outputs the sound of the image information or document information; and/or
a sound input unit that receives the input of sound for the image information or document information.

15. The document presentation device according to claim 9, further comprising a code reading unit that reads identification codes allocated to the image information or document information displayed in the display unit for identifying the image information or document information, wherein
the display unit displays the image information or document information corresponding to identification codes read by the code reading unit.

16. The document presentation device according to claim 15, further comprising a code output unit that outputs identification codes allocated to the image information or document information displayed in the display unit for identifying the image information or document information to a printing device.

17. The document presentation device according to claim 9, comprising:
- an information input unit to which document information from a document output device is input, wherein
- the display unit displays image information taken by the imaging unit or document information input into the information input unit as either static images or moving images;
- a touch panel that receives input for instructions for the display unit,
- the device integrally comprising:
- a superposition unit that superimposes instructions received by the touch panel as figures on the display unit;
- a projector unit that projects image information or document information displayed in the display unit on a projection area;
- the imaging unit;
- the information input unit; and
- the display unit.

18. The document presentation device according to claim 17, further comprising:
- a switching unit that switches the information displayed in the display unit between the image information and the document information; and
- an information output unit that outputs the image information or document information displayed in the display unit to an image display device.

19. The document presentation device according to claim 17, further comprising:
- a casing having the display unit;
- a first rotatable body that projects from a side wall of the casing and that can freely rotate about the direction of projection; and
- a second rotatable body that is provided on the first rotatable body so that the second rotatable body supports the projector unit rotatably about a direction perpendicular to the projection direction of the first rotatable body.

20. The document presentation device according to claim 19, wherein
- the first rotatable body can be separated from the side wall of the casing, and
- the first rotatable body is connected to the side wall of the casing so that the image information taken by the imaging unit or the document information input by the information input unit can be projected on the projection area by the projector unit.

21. The document presentation device according to claim 17, further comprising:
- a casing having the display unit;
- a first rotatable body that projects from a side wall of the casing and that can freely rotate about the direction of projection;
- an opening and closing unit that can open and close provided at one end of the first rotatable body having a reflection surface on a face opposite to the projector unit when the opening and closing unit is closed, and changes the direction of reflection of the image information or document information projected by the projector unit outside the document presentation device by the opening and closing operation.

* * * * *